United States Patent
Pennington, III et al.

(10) Patent No.: US 12,107,522 B2
(45) Date of Patent: Oct. 1, 2024

(54) SYSTEM AND METHOD FOR CONTROLLING A MOTOR

(71) Applicant: TAU MOTORS, INC., Redwood City, CA (US)

(72) Inventors: Walter Wesley Pennington, III, Menlo Park, CA (US); Ethan Bagget Swint, Redwood City, CA (US); Anthony Da Costa, Los Altos, CA (US); Matthew J. Rubin, Indianapolis, IN (US)

(73) Assignee: TAU MOTORS, INC., Redwood City, CA (US)

( * ) Notice: Subject to any disclaimer, the term of this patent is extended or adjusted under 35 U.S.C. 154(b) by 0 days.

(21) Appl. No.: 18/576,699

(22) PCT Filed: Jul. 7, 2022

(86) PCT No.: PCT/US2022/036417
§ 371 (c)(1),
(2) Date: Jan. 4, 2024

(87) PCT Pub. No.: WO2023/283378
PCT Pub. Date: Jan. 12, 2023

(65) Prior Publication Data
US 2024/0266978 A1    Aug. 8, 2024

Related U.S. Application Data

(60) Provisional application No. 63/219,096, filed on Jul. 7, 2021.

(51) Int. Cl.
*H02P 21/14* (2016.01)
*H02P 6/32* (2016.01)
(Continued)

(52) U.S. Cl.
CPC ............... *H02P 21/14* (2013.01); *H02P 6/32* (2016.02); *H02P 6/34* (2016.02); *H02P 21/22* (2016.02); *H02P 2207/07* (2013.01)

(58) Field of Classification Search
CPC .... H02P 21/14; H02P 6/32; H02P 6/34; H02P 21/22; H02P 2207/07
(Continued)

(56) References Cited

U.S. PATENT DOCUMENTS 7,132,816 B1 * 11/2006 Markunas ............... H02P 21/32
318/400.02
2002/0171387 A1    11/2002 Stancu et al.
(Continued)

OTHER PUBLICATIONS

International Search Report and Written Opinion issued in corresponding PCT/US2022/036417, mailed Nov. 25, 2022.

*Primary Examiner* — Kawing Chan
(74) *Attorney, Agent, or Firm* — Quarles & Brady, LLP

(57) ABSTRACT

Systems and methods are provided for controlling and simulating a motor. An electronic motor controller determines present motor information and a motor control parameter set based on the present motor information and a rotating reference frame of the motor. The rotating reference frame has independent input channels that decouple an intended output response in a stator D-axis component and a rotor field (R) component of a direct-quadrature-null-rotor (DQNR) reference frame. The electronic motor controller further controls the motor based on the motor control parameter set.

15 Claims, 16 Drawing Sheets

(51) Int. Cl.
  *H02P 6/34*   (2016.01)
  *H02P 21/22*  (2016.01)
(58) Field of Classification Search
  USPC .......................................................... 318/717
  See application file for complete search history.

(56) References Cited

U.S. PATENT DOCUMENTS

| | | | |
|---|---|---|---|
| 2005/0029982 A1* | 2/2005 | Stancu | H02P 21/0089 318/801 |
| 2006/0055363 A1 | 3/2006 | Patel et al. | |
| 2011/0285332 A1* | 11/2011 | Pollock | H02P 21/18 318/400.02 |
| 2014/0117912 A1* | 5/2014 | Gajic | H02H 7/06 318/490 |
| 2016/0233807 A1 | 8/2016 | Rogg et al. | |
| 2021/0165011 A1 | 6/2021 | Thyagarajan | |
| 2023/0402947 A1* | 12/2023 | Bouchet | H02P 21/36 |

* cited by examiner

SYSTEM AND METHOD FOR CONTROLLING A MOTOR

CROSS-REFERENCE TO RELATED APPLICATIONS

This application is a 371 application of PCT/US2022/036417 filed Jul. 7, 2022, which claims priority to U.S. Provisional Application No. 63/219,096 titled "System and Method for Controlling Wound Field Synchronous Motor," filed on Jul. 7, 2021, each of which is hereby incorporated by reference in its entirety.

STATEMENT REGARDING FEDERALLY SPONSORED RESEARCH

N/A

BACKGROUND

Electric motors of various types have been produced and used in many industries and contexts. A synchronous motor is an alternating current (AC) motor having a stator that is driven by AC supply signals (e.g., one signal for each phase of the stator) to cause rotation of a rotor. More particularly, the AC supply signals in stator windings of the stator generate magnetic fields that interact with a magnetic field or fields of the rotor to cause rotation of the rotor. The rotation of the rotor is generally synchronous with the frequency of the AC supply current. The rotor may be a permanent magnet rotor or a wound field rotor. In the case of a wound field rotor, current is supplied to one or more field windings of the rotor to generate the magnetic field or fields of the rotor.

SUMMARY OF THE DISCLOSURE

Controlling the application of current to the stator windings and rotor windings at the particular time and amplitude to efficiently drive a wound field synchronous (WFS) motor can be challenging. For example, a motor controller may control an inverter to provide an AC signal to each phase of the motor based on current rotor position and other characteristics of the motor. The physics of the magnetic fields of each stator winding interacting with the rotating rotor can lead to complex mathematics problems that are challenging to create and solve to address factors that lead to efficient driving of the motor.

In some systems, motor controllers operate using a rotating reference frame to simplify the motor control. For example, motor characteristics (in a stationary reference frame) may be measured and transformed into a direct-quadrature-Null (DQN) space, or DQN+rotor (R) space or reference frame (also referred to as the DQNR, RDQNull, and RDQØ reference frame), using a transform based on the Clarke and Park transforms. In other words, the motor characteristics (e.g., stator currents, rotor currents, and rotor position) can be transformed into a D-axis value, a Q-axis value, an N-axis (or Ø-axis) value, and an R (rotor field) value. By using a rotating reference frame where the stator rotates at the frequency of the AC signals, the AC signals can be treated as direct current signals (i.e., the D, Q N, and R values), which can simplify the calculations used to determine control signals. Desired DQN and R values may be calculated based on the determined DQN and R values, and then transformed back into stator and rotor control values in the stationary reference frame to control the motor.

Relative to permanent magnet (PM) synchronous motors, in RDQN control schemes for WFS motors, the rotor provides an extra state cross-coupling between the (stator) D-axis and R (rotor field), in addition to a state of coupling between the (stator) D-axis and Q-axis that may exist in both PM synchronous and WFS motors. In other words, for both PM synchronous and WFS motors, changes to the D-axis impact the Q-axis and changes to the Q-axis impact the D-axis. However, for WFS motors, an additional control complexity is present in that changes to the D-axis impact R, and changes to R impact the D-axis. This cross-coupling between the D-axis and R components stems, at least in some cases, from the inherent air gap between the stator and rotor, which leads to non-negligible leakage current and an effective rotor-stator turns ratio that is different than intended. These cross-couplings increase the complexity and present challenges to designing motors and motor controllers for high performance applications of WFS motors.

Cross coupling occurs when a change in one dimension also induces a change in another dimension. For instance, a change in D-axis voltage also creates a change in rotor field current and flux. Similarly, a change in rotor field voltage also induces a change in stator D-axis current. A cross-coupling may be described as being present or appreciable when a change in one dimension induces a change in another dimension by more than 1%, more than 10%, or more than 50%. A cross-coupling may be described as "tight" or "loose," where the greater the induced change, the tighter the coupling. A cross-coupling may be considered loose when a change in one dimension causes an induced change of between 1-10%, between 10-20%, less than 10%, or less than 20% in a second dimension. A cross-coupling may be considered tight when a change in one dimension causes an induced change in a second dimension of between 30-50%, between 50-90%, greater than 30%, or greater than 50%. Two dimensions (or variables or components) may be considered decoupled when a change in one dimension does not cause an induced change in another dimension, or does not cause an induced change in another dimension above a threshold level, such as 0.5% or 1%.

Embodiments described herein relate to motor controllers that use or rely on a rotating reference frame that has independent input channels that decouple an intended output response in the D-axis component from the rotor field (R) component. For example, in some embodiments, the motor controllers may use or rely on an MK transform for transforming to an MK (rotating) reference frame, which includes a magnetizing inductance axis (M-axis), a leakage inductance axis (K-axis), a quadrature axis (Q-axis), and a null axis (N-axis). Additionally, in some embodiments, the motor controllers may use or rely on an SM/DM transform for transforming to an SM/DM (rotating) reference frame, which includes a summation mode axis (SM-axis), a difference mode axis (DM-axis), a quadrature axis (Q-axis), and a null axis (N-axis). By decoupling the intended output response of the D-axis component from the rotor field (R) component, the WFS motor system is diagonalized, simplifying WFS motor design and/or control.

In one example, a method is provided for controlling a wound field synchronous motor. The method includes determining, by an electronic motor controller, present motor information. The method further includes determining, by the electronic motor controller, a motor control parameter set based on the present motor information and a rotating reference frame of the motor. The rotating reference frame has independent input channels that decouple an intended output response in a stator D-axis component and a rotor field (R) component of a direct-quadrature-null-rotor (DQNR) reference frame. The method further includes controlling, by the electronic motor controller, the motor based on the motor control parameter set.

In another example, a motor system is provided. The motor system includes an electronic motor controller including an electronic processor. The electronic motor controller is configured to: determine present motor information and to determine a motor control parameter set based on the present motor information and a rotating reference frame of a wound field synchronous motor. The rotating reference frame has independent input channels that decouple an intended output response in a stator D-axis component and a rotor field (R) component of a direct-quadrature-null-rotor (DQNR) reference frame. The electronic motor controller is further configured to output control signals to the motor based on the motor control parameter set.

In another example, a method for simulating a wound field synchronous motor is provided. The method includes determining, by an electronic controller, one or more initial motor specifications. The method further includes determining, by the electronic controller, one or more motor operation simulation parameters. The method also includes simulating, by the electronic controller, a wound field synchronous motor according to the one or more initial motor specifications and the one or more motor operation simulation parameters using motor control based on a rotating reference frame of the motor. The rotating reference frame has independent input channels that decouple an intended output response in a stator D-axis component and a rotor field (R) component of a direct-quadrature-null-rotor (DQNR) reference frame. The method further includes generating simulation results in the rotating reference frame based on the simulating of the motor.

In another example, a motor system is provided. The motor system includes an electronic motor controller including an electronic processor. The electronic motor controller is configured to determine one or more initial motor specifications, and to determine one or more motor operation simulation parameters. The electronic motor controller is further configured to simulate a wound field synchronous motor according to the one or more initial motor specifications and the one or more motor operation simulation parameters using motor control based on a rotating reference frame of the motor. The rotating reference frame has independent input channels that decouple an intended output response in a stator D-axis component and a rotor field (R) component of a direct-quadrature-null-rotor (DQNR) reference frame. The electronic motor controller is further configured to generate simulation results in the rotating reference frame based on the simulating of the motor.

The foregoing and other aspects and advantages of the present disclosure will appear from the following description. In the description, reference is made to the accompanying drawings that form a part hereof, and in which there is shown by way of illustration one or more embodiments. These embodiments do not necessarily represent the full scope of the invention(s), however, and reference is therefore made to the claims and herein for interpreting the scope of the invention(s). Like reference numerals will be used to refer to like parts from Figure to Figure in the following description.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, functions performed by multiple components may be consolidated and performed by a single component. Similarly, the functions described herein as being performed by one component may be performed by multiple components in a distributed manner. Additionally, a component described as performing particular functionality may also perform additional functionality not described herein. For example, a device or structure that is "configured" in a certain way is configured in at least that way, but may also be configured in ways that are not listed.

As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "comprising," "including," "containing," "having," and variations thereof herein is meant to encompass the items listed thereafter and equivalents thereof as well as additional items. Additionally, the terms "connected" and "coupled" are used broadly and encompass both direct and indirect connecting and coupling, and may refer to physical or electrical connections or couplings. Furthermore, the phase "and/or" used with two or more items is intended to cover the items individually and both items together. For example, "a and/or b" is intended to cover: a; b; and a and b.

Figure 1:
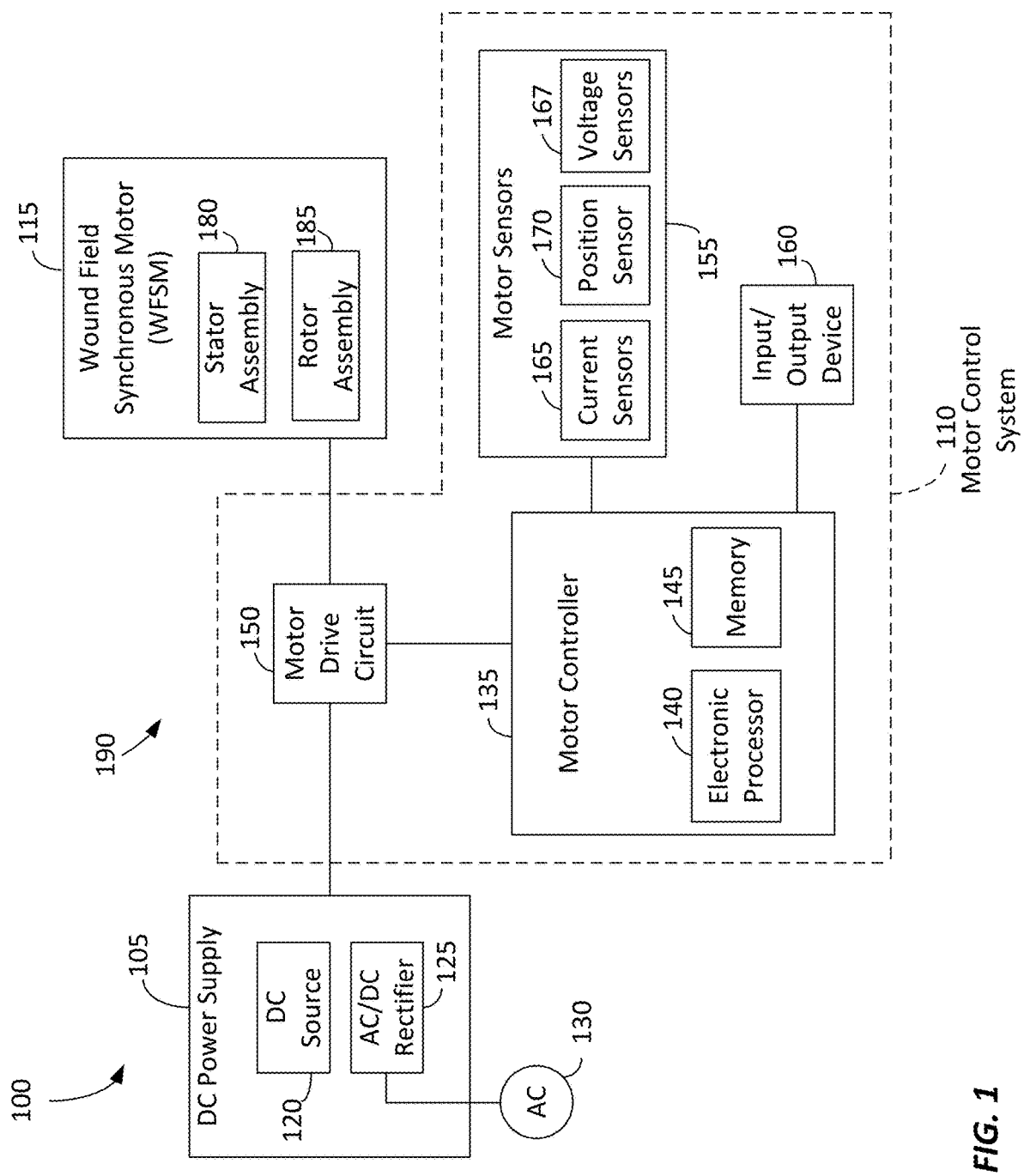
FIG. 1 illustrates a motor system for a wound field synchronous (WFS) motor according to some embodiments.

FIG. 1 illustrates a wound field synchronous motor (WFS) motor system 100, according to some embodiments. The WFS motor system 100 includes a power supply 105, a motor control system 110, and a wound field synchronous (WFS) motor 115. The power supply 105 provides direct current (DC) power to the motor control system 110. In some embodiments, the power supply 105 includes a DC power source 120 that provides the DC power to the motor control system 110. The DC power source 120 may be, for example, one or more batteries, photovoltaic cells, or the like. In some embodiments, the power supply 105 includes an AC/DC rectifier 125 that receives alternative current (AC) power from an AC power source 130, which may be a utility grid or external generator. In these embodiments, the AC/DC rectifier 125 outputs the DC power to the motor control system 110. In some embodiments, the AC power source 130 is part of the power supply 105 (e.g., in the case of an on-site wind turbine or generator). In some embodiments, the power supply 105 includes both the DC power source 120 and the AC/DC rectifier 125, and the DC power from the power supply 105 to the motor control system 110 is provided from one or both sources.

The motor control system 110 is configured to control the application of power from the DC power supply 105 to the motor 115 to drive rotation of the motor 115. More particularly, the motor control system 110 includes a motor controller 135 with an electronic processor 140 and a memory 145 (collectively, processing circuitry), a motor drive circuit 150, motor sensors 155, and an input/output device 160. Generally, the motor controller 135 monitors characteristics of the motor 115 based on signals received from the motor sensors 155 and, based on these characteristics, provides control signals to the motor drive circuit 150 to control the application of power from the DC power supply 105 to the motor 115 to drive rotation of the motor 115.

The input/output device 160 may include one or more of displays, touchscreens, touchscreen displays, keyboards, mice, pushbuttons, dials, pedals, microphones, speakers, and the like. In some embodiments, the input/output device 160 is configured to receive operational parameters, such as a motor speed command or motor torque command, and to provide the operational parameters to the motor controller 135. In response, the motor controller 135 uses the operational parameters, in combination with the signals from the motor sensors 155, to control the application of power from the DC power supply 105 to the motor 115 to drive rotation of the motor 115. The input/output device 160 may be local to the other components of the motor control system 110 or may be remote and connected via one or more intermediary communication networks or interfaces.

The motor sensors 155 include current sensors 165, voltage sensors 167, and a position sensor 170 for determining the position of a rotor of the motor 115. In some embodiments, additional or fewer motor sensors are included in the motor sensors 155. For example, the motor sensors 155 may also include one or more vibration sensors, temperature sensors, and the like. In some embodiments, current and/or voltage sensors are provided for each stator phase and/or each rotor phase of the motor 115. In some examples, the motor controller 135 infers a first motor characteristic (e.g., current or voltage), rather than directly sensing the motor characteristic. Accordingly, in some embodiments, for example, one or more of the current sensors 165 is/are not included in the motor system 100. For example, the motor controller 135 may be configured to determine rotor current or a state of the motor configuration via the voltage sensors 167 on the stator assembly 180 (e.g., by sensing back electromotive force (back emf)). In another example, the motor controller 135 is configured to infer incremental inductance via sensing voltage and/or current, and changes thereto, with respect to time.

In some examples, the position sensor 170 is a Hall effect sensor configured to sense and output an indication of a magnetic field of a rotating rotor passing nearby the sensor, which is indicative of the rotor position of the motor 115. In some examples, the position sensor 170 is a rotary encoder (e.g., optical or mechanical), that provides an output indicative of the rotation position of the rotor of the motor 115. Additionally, in some examples, the motor controller 135 implements "sensorless" control that derives rotor position through monitoring of current and/or voltage of the motor 115, such that a separate position sensor 170 may not be included in the motor sensors 155. The motor controller 135 may determine the position or rotational speed of the rotor through back emf estimation (e.g., based on voltage changes in stator windings), or through high frequency signal injection or perturbation. For example, the motor controller 135 may inject a perturbation into the motor assembly 190 to prevent the motor assembly 190 from operating at steady-state over meaningful periods of time. Such a signal can be used to prevent unobservable conditions, e.g. unidentifiable position, or force energy exchange between the stator and rotor. Typically, a perturbation is chosen with a frequency that is at least 1-2, 2-5, or 5-10 times higher than a fundamental frequency of the motor assembly 190 to prevent an interaction with torque generation resulting in, for example, torque ripple.

The memory 145 includes one or more of a read only memory (ROM), random access memory (RAM), or other non-transitory computer-readable media. The electronic processor 140 is configured to, among other things, receive instructions and data from the memory 145 and execute the instructions to, for example, carry out the functionality of the motor controller 135 described herein, including the processes 400, 500, and 700 of FIGS. 4, 5, and 7, respectively. For example, the memory 145 includes control software defining, among other things, control techniques for the motor 115. As described in further detail below, generally, the electronic processor 140 may be configured to execute the control software to monitor characteristics of the motor 115, receive operational parameters (e.g., motor commands), and to drive the motor drive circuit 150 in accordance with the operational parameters and monitored characteristics. In some embodiments, instead of or in addition to executing software from the memory 145 to carry out the functionality of the motor controller 135 described herein, the electronic processor 140 includes one or more hardware circuit elements configured to perform some or all of this functionality.

Although the motor controller 135, the electronic processor 140, and the memory 145 are each illustrated as a respective, single unit, in some embodiments, one or more of these components is a distributed component. For example, in some embodiments, the electronic processor 140 includes one or more microprocessors and/or hardware circuit elements.

The WFS motor 115 includes a stator assembly 180 and a rotor assembly 185. The stator assembly 180 includes a stator core and a plurality of stator windings on the stator core that are selectively driven with current to induce magnetic fields that rotate the rotor assembly 185. The stator core may be, for example, a lamination stack formed by a plurality of laminations. The lamination stack may include a generally annular profile with teeth extending radially inward (in the case of an outer stator) or radially outward (in the case of an inner stator). The stator windings may be wrapped around the teeth or may include conductors that otherwise fill the slots between teeth. The rotor assembly 185 includes a rotor core and one or more field windings that are selectively driven with current to induce magnetic fields that interact with the magnetic fields of the stator assembly 180 to rotate the rotor assembly 185. The rotor core may be, for example, a lamination stack formed by a plurality of laminations. The lamination stack may include a generally annular profile with teeth extending radially inward (in the case of an outer rotor) or radially outward (in the case of an inner rotor). The rotor windings may be wrapped around the teeth or may include conductors that otherwise fill the slots between teeth. In some embodiments, the rotor assembly 185 includes a combination of a permanent magnets and field windings (i.e., a hybrid permanent magnet-wound field rotor).

Although the examples provided within this disclosure are primarily described with respect to a wound field synchronous motor (e.g., the WFS motor 115), in some examples, the motor used is a non-wound field motor. For example, in some embodiments, the WFS motor 115 is implemented as a non-wound field motor, such as a permanent magnet synchronous motor, and this non-wound field motor is used in the systems and processes described herein.

Further, as is well known, an electric machine serving as an electric motor that outputs mechanical power from input electric power may also operate in reverse and serve as an electric generator that outputs electric power from input mechanical power. Accordingly, for ease of description, the electric machines described herein will generally be referred to as motors (e.g., the WFS motor 115), but are meant to also encompass electric generators and devices that may operate as both an electric motor and an electric generator.

Figure 2:
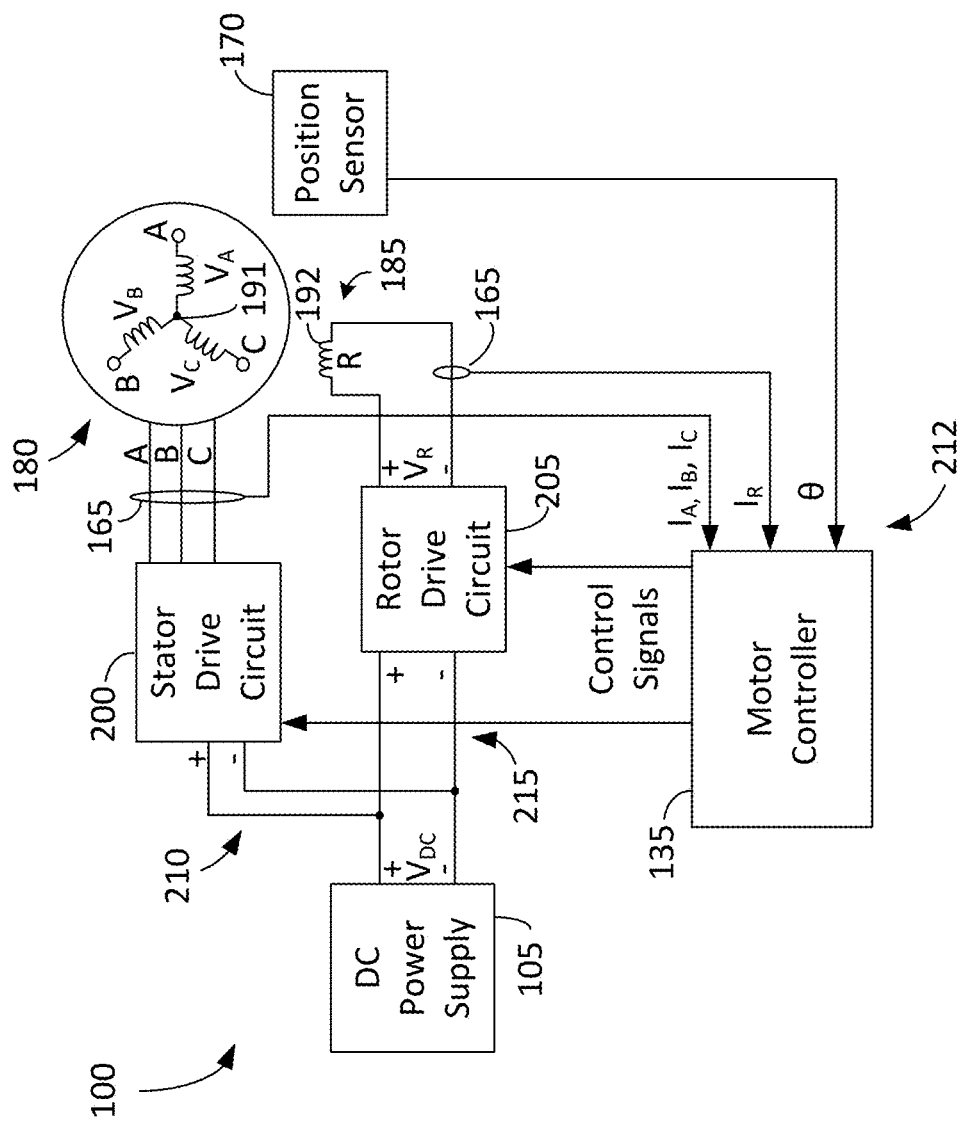
FIG. 2 illustrates a control diagram for the motor system of FIG. 1 according to some embodiments.

FIG. 2 illustrates a block diagram of the system 100, according to some embodiments, with certain aspects illustrated in further detail. For example, FIG. 2 illustrates a stator drive circuit 200 and a rotor drive circuit 205, both of which may be part of the drive circuit 150 (of FIG. 1). The stator drive circuit 200 receives DC power on a DC stator bus 210 from the DC power supply 105 and control signals from the motor controller 135. The DC stator bus 210 has a positive leg (positive (+) $V_{DC\_stator}$ bus leg and a negative leg (negative (−) $V_{DC\_stator}$ bus leg). The stator drive circuit 200 selectively applies power received from the DC power supply 105 to stator windings of the stator assembly 180 based on the control signals received from the motor controller 135.

The stator drive circuit 200 includes, for example, a plurality of power switching elements connected in a bridge configuration. The power switching elements are semiconductor switching devices such as, for example, a field effect transistor (FET) (e.g., a metal-oxide-semiconductor field effect transistors (MOSFETs)), a bipolar junction transistor (BJT), or insulated gate bipolar transistor (IGBT). The stator drive circuit 200 may include an output terminal for each phase of the stator assembly 180. For example, in embodiments of the stator assembly 180 having three phases, the stator drive circuit 200 may include three output terminals, each connected to a terminal of a respective phase of the stator assembly 180. The motor controller 135 may control the stator drive circuit 200 to generate a sinusoidal drive signal at each output terminal to drive each phase of the stator assembly 180 with a respective sinusoidal drive signal.

In the illustrated embodiments, the stator drive circuit 200 is connected to the stator assembly 180 at three nodes, one for each of three phases A, B, and C of the stator assembly 180. Each phase includes one or more windings coupled between the node associated with the phase (e.g., the A node, the B node, or the C node) and a common 191. In FIG. 2, one representative winding is illustrated between each respective node associated with a phase and the common node 191. In some embodiments, the stator assembly 180 includes additional phases and/or windings. The drive circuit 200 may include a respective output node providing a respective AC drive signal for each phase of the stator assembly 180.

The rotor drive circuit 205 receives DC power from the DC power supply 105 and control signals from the motor controller 135. More particularly, the rotor drive circuit 205 receives DC power on a DC rotor bus 215 from the DC power supply 105. The DC rotor bus 215 has a positive leg (positive (+) $V_{DC\_rotor}$ bus leg and a negative leg (negative (−) $V_{DC\_rotor}$ bus leg). Although the DC stator bus 210 and rotor bus 215 are illustrated as coupled together and may be shared in some embodiments, in other embodiments, the DC power supply 105 may include independent connections to each bus. For example, the independent connections may be used to provide different DC voltage levels to each bus. For example, in some embodiments, the DC stator bus 210 may have a significantly higher voltage level (e.g., 400V or another level) than the DC rotor bus 215 (e.g., 12V or another level) during operation of the motor 115. In some embodiments, the DC rotor bus 215 may be an isolated bus (e.g., without a direct conductive connection to the DC power supply 105), and the DC power supply 105 supplies power to the DC rotor bus 215 via a wireless link (e.g., an inductive or capacitive link).

The rotor drive circuit 205 selectively applies power received from the DC power supply 105 (e.g., from the DC rotor bus 215) to one or more rotor windings of the rotor assembly 185 based on the control signals received from the motor controller 135. The rotor drive circuit 205 includes, for example, a plurality of power switching elements connected in a bridge configuration. The power switching elements are semiconductor switching devices such as, for example, a field effect transistor (FET) (e.g., a metal-oxide-semiconductor field effect transistors (MOSFETs)), a bipolar junction transistor (BJT), or insulated gate bipolar transistor (IGBT). The rotor drive circuit 205 may include an output terminal or pair of output terminals for each independently controllable winding (or set of windings) of the rotor assembly 185. In the illustrated embodiments, the rotor drive circuit 205 is connected to the rotor assembly 185 at two nodes, with a representative winding 192 illustrated between the two nodes. In some embodiments, the rotor assembly 185 includes additional phases and/or windings. The rotor drive circuit 205 may include a respective output node (or pair of nodes) providing a respective AC drive signal for each phase of the rotor assembly 185.

The rotor drive circuit 205 provides a power coupling between the power supply 105, which is stationary (i.e., non-rotating), and the one or more windings of the rotor assembly 185, which rotates. Thus, the rotor drive circuit 205 may include a stationary portion and a rotary portion. For example, the rotor drive circuit 205 may include a slip ring that provides a conductive connection between the stationary portion and the rotary portion. The slip ring may include one or more conductors as part of the rotary portion and one or more conductive brushes as part of the stationary portion. Each of the conductors may be coupled to a rotor shaft or another portion of the rotor assembly 185 to rotate therewith. The conductive brushes include at least one conductive brush per conductor of the slip ring and maintain an electrical connection with the associated conductors of the slip ring as the slip ring rotates with the rotor assembly 185. Each conductive brush may serve as a respective output node of the rotor drive circuit 205. The conductors on the slip ring may serve as the nodes across which the rotor windings are provided (e.g., the winding 192).

As illustrated in FIG. 2, the motor controller 135 may include inputs 212 to receive output signals from one or more sensors, such as the current sensors 165 and the position sensor 170. In some embodiments, the motor controller 135 may determine present motor information for the WFS motor 115 based on the received output signals, such as one or more of rotor position angle of the rotor ($\theta$), rotor field current ($I_R$) of the rotor assembly 185, stator field currents ($I_A$, $I_B$, and $I_C$) of the stator field assembly 180, rotor field voltage ($V_R$), and stator field voltages ($V_A$, $V_B$, $V_C$). In some embodiments, the motor controller 135 determines the voltage measurements by inferring the voltages based on known characteristics of the WFS motor 115 (e.g., known resistances and inductances in windings) in combination with the current measurements, or based on outputs from one or more of the voltage sensors 167 (see FIG. 1). In some embodiments in which additional stator phases (i.e., more than three) and/or additional independently controllable rotor fields are provided, the motor controller 135 may further determine currents and/or voltages for each of these additional stator phases and/or rotor fields. Additionally, as previously noted, in some embodiments, the motor controller 135 determines one or more of these aspects of the present motor information with different sensors based on inferences (see, e.g., discussion of "sensorless" position sensing above).

Figure 3:
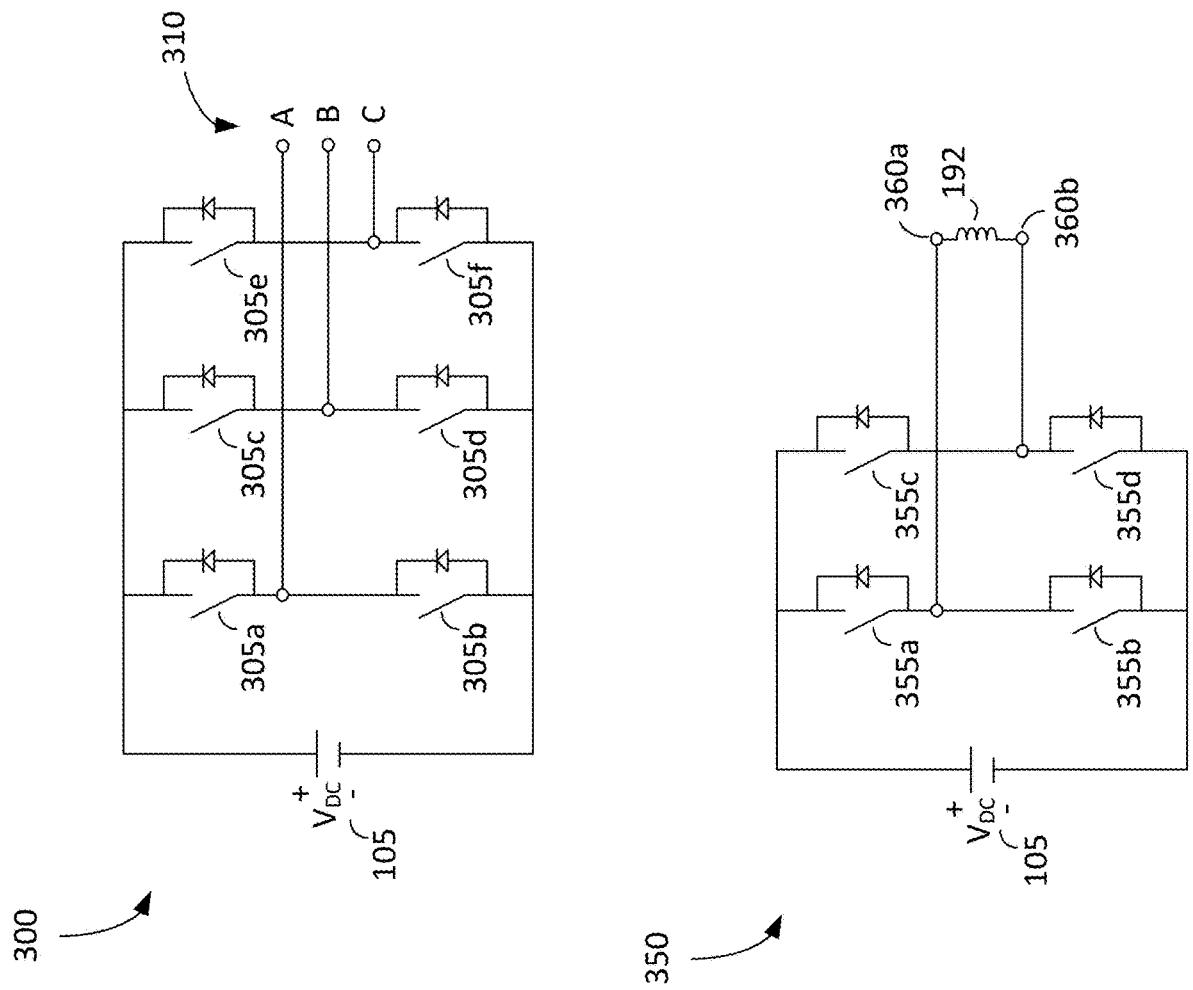
FIG. 3 illustrates a stator drive circuit and a rotor drive circuit according to some embodiments.

FIG. 3 illustrates a stator drive circuit 300 and a rotor drive circuit 350 according to some embodiments. The stator drive circuit 300 is an example of the stator drive circuit 200 of FIG. 2. The rotor drive circuit 350 is an example of the rotor drive circuit 205 of FIG. 2. The stator drive circuit 300 includes six power switching elements 305a-f in an inverter bridge arrangement. Each of the power switching elements 305a-f is controlled by a respective control signal from the motor controller 135 to be enabled or disabled. The stator drive circuit 300 includes three outputs 310 coupled to a mid-point between a respective pair of the power switching elements 305a,b, 305c,d, and 305e,f. Each output 310 may be coupled to a respective phase of the stator assembly 180 (e.g., at nodes A, B, and C in FIG. 2). The stator drive circuit 200 may be current or voltage controlled.

The rotor drive circuit 350 includes four power switching elements 355a-d. Each of the power switching elements 355a-d is controlled by a respective control signal from the motor controller 135 to be enabled or disabled. The rotor drive circuit 350 includes two output nodes 360a and 360b, across which is coupled the rotor winding 192.

In some embodiments, drive circuits other than those illustrated in FIG. 3 are used as the stator drive circuit 200, the rotor drive circuit 205, or both. For example, the stator drive circuit 200 may use a different switch bridge arrangements, such as a switch bridge having additional levels to provide a finer granularity of control and, for example, reduce ripple. Additionally, in some embodiments, the stator drive circuit 200 may be a current-controlled circuit that uses a current source as a supply (e.g. provided by power supply 105), rather than voltage-controlled circuit that uses the voltage source 105 as a supply. Similarly, the rotor drive circuit 205 may use a switch bridge having additional levels, and/or may be a current-controlled circuit with a current source.

As noted above, embodiments described herein relate to motor controllers that use or rely on a rotating reference frame that has independent input channels (or control input channels) that, in contrast to the R-axis and D-axis, provide a decoupled output response, thereby decoupling an intended output response in the stator D-axis component from the rotor field (R) components in the DQNR reference frame. For example, in some embodiments, the motor controller 135 may use or rely on an MK transform for transforming to an MK (rotating) reference frame, which includes a magnetizing inductance axis (M-axis), a leakage inductance axis (K-axis), a quadrature axis (Q-axis), and a null axis (N-axis). Stated another way, the M-axis may control the total inductance of the motor and represents the magnetizing current in an equivalent circuit for the stator and motor (e.g., a transformer model); and the K-axis may control the leakage inductance and represents the total leakage current in the transformer. The M-axis, K-axis, Q-axis, and N-axis may be considered independent input channels (or independent control channels) of the MK reference frame. The MK reference frame may also be referred to as the MKQ MKQN, MKQNull, or MKQØ reference frame. As another example, in some embodiments, the motor controller 135 may use or rely on an SM/DM transform for transforming to an SM/DM (rotating) reference frame, which includes a summation mode axis (SM-axis), a difference mode axis (DM-axis), a quadrature axis (Q-axis), and a null axis (N-axis). The SM-axis, DM-axis, Q-axis, and N-axis may be considered independent input channels (or independent control channels) of the SM/DM reference frame. The SM/DM reference frame may also be referred to as the SM/DM Q SM/DM QN, SM/DM QNull, or SM/DM QØ reference frame.

Both the MK and SM/DM reference frame address and describe the coupling between the D-axis, also referred to as the stator D-axis, and the rotor field (R), also referred to as the rotor control or rotor D-axis. In these reference frames, the coupling means that air gap field energy of the WSM motor 115 comes from rotor current and/or stator D-axis current independently or at the same time. The air gap field energy is represented by the M-axis in the MK reference frame, and the SM-axis in the SM reference frame. The other axes of each reference frame, the K-axis and the DM-axis, represent the energy from the rotor and stator side that is not seen across the air gap, which is energy that is stored in leakage inductance of each component (rotor or stator).

The MK reference frame decouples an intended output response in the D-axis from the rotor field (R) in that a controller may adjust the M-axis and K-axis components in the MK reference frame to ultimately vary the D-axis component while inducing little or no change in the rotor field R component in the DQNR reference frame or to ultimately vary the rotor field R component while inducing little or no change in the D-axis component in the DQNR reference frame. Thus, the MK reference frame has independent input channels that decouple the intended output response of the D-axis component from the rotor field (R) component because, via the MK reference frame, the controller 135 is configured to (i) control changes in the D-axis component that induce no unintentional change or an insignificant unintentional change in the rotor field (R) component (e.g., a change is below a threshold level, such as 0.5% or 1%, and (ii) control changes in the rotor field (R) component that induce no unintentional change or an insignificant change in the D-axis component (e.g., a change that is below a threshold level, such as 0.5% or 1%). In other words, the motor system 100 is diagonalized, or approaching diagonalization, using the MK reference frame, which provides a decoupled input/output system, in contrast the R and D components of the RDQN system, and decouples an intended output response for the D-axis component from the rotor field (R) component. Stated another way, the MK reference frame includes components (the M-axis and K-axis components) that may be adjusted by the motor controller 135 to independently, or nearly independently, control the D-axis and rotor field (R) components in the DQNR reference frame of the WFS motor 115. The diagonalized system with decoupled components can simplify design and/or control of the WFS motor 115. Further, in some embodiments, it may be useful to create a change in one axis (e.g., the rotor field (R) component) based on a change in another axis (e.g., the D-axis). Where these changes were previously uncontrollable and unpredictable byproducts due to the coupling of these components, with the MK reference frame, the motor controller 135 can control such changes (or, as noted, prevent them).

The SM/DM reference frame decouples an intended output response in the D-axis from the rotor field (R) in that a controller may adjust the SM-axis and DM-axis components in the SM/DM reference frame to ultimately vary the D-axis component while inducing little or no change in the rotor field R component in the DQNR reference frame or to ultimately vary the rotor field R component while inducing little or no change in the D-axis component in the DQNR reference frame. Thus, the SM/DM reference frame has independent input channels that decouple the intended output response of the D-axis component from the rotor field (R) component because, via the SM/DM reference frame, the controller 135 is configured to (i) control changes in the D-axis component that induce no change or an insignificant change in the rotor field (R) component (e.g., a change is below a threshold level, such as 1%, 5%, 10%, or 20%) and (ii) control changes in the rotor field (R) component that induce no change or an insignificant change in the D-axis component (e.g., a change that is below a threshold level, such as 1%, 5%, 10%, or 20%). Using the SM/DM reference frame, the motor system 100 is diagonalized, simplifying design and/or control of the WFS motor 115. Stated another way, the SM/DM reference frame includes components (the SM-axis and DM-axis components) that may be adjusted by the motor controller 135 to independently, or nearly independently, control the D-axis and rotor field (R) components in the DQNR reference frame of the WFS motor 115.

The MK and SM/DM reference frame may be similar or equivalent reference frames in certain instances, such as when the stator and rotor leakages are equal (or assumed to be equal) or after adjusting for an apparent turns ratio for the WFS motor 115. However, the MK reference frame may completely decouple the leakage component (K-axis) from the rest of the system by assuming an apparent equal-leakage ratio between stator and rotor using a degree of freedom in the system for the turns ratio, stator leakage, and rotor leakage. In some cases, the MK reference frame may rely on an imposition of a turns ratio between the rotor and stator D-axis.

In contrast to SM/DM and MK reference frames, the RDQN reference frame is not able to distinguish between the R and stator D-axis energy—that is, the RDQN reference frame does not indicate or account for whether a source of energy is coming from the stator or rotor on the common axis (D-axis) of a WFS motor. The SM/DM and MK reference frames provide insight into this energy flow of the WFS motor 115, which translates into controls specific to each of the rotor and stator of the WFS motor 115.

Figure 4:
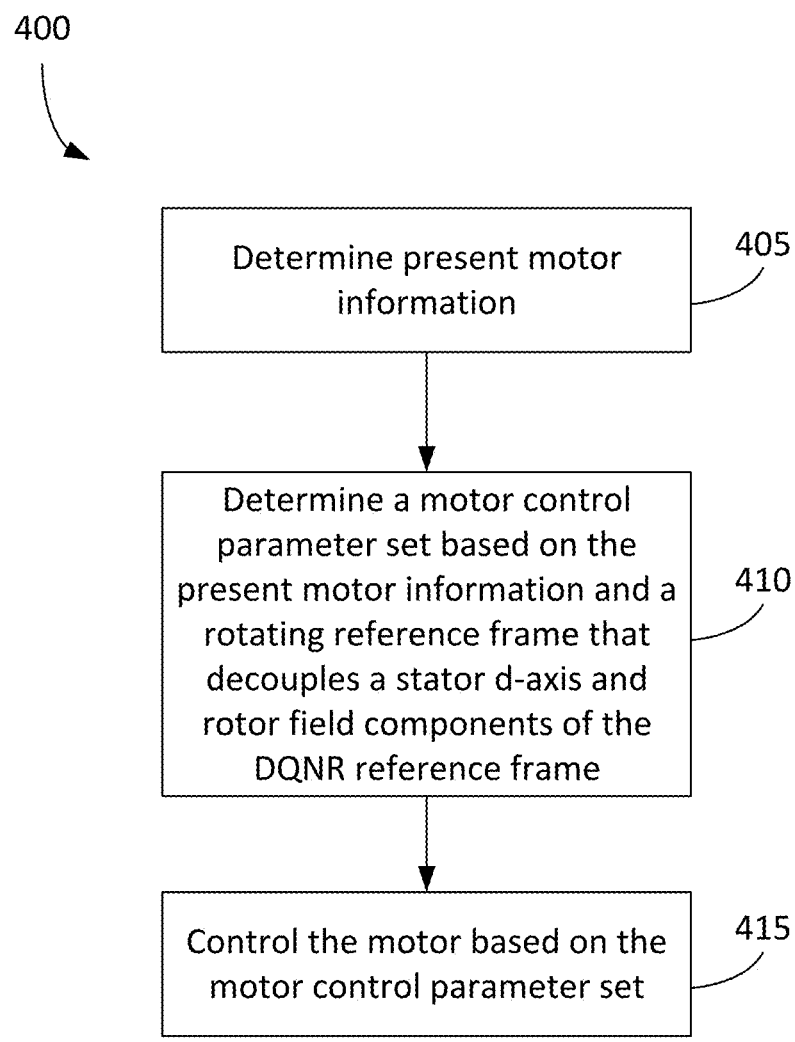
FIG. 4 illustrates a process for controlling a WFS motor according to some embodiments.

FIG. 4 illustrates a process 400 for controlling a wound field synchronous motor. The process 400 is described as being carried out by the motor system 100. However, in some embodiments, the process 400 may be implemented by another motor system. Additionally, although the blocks of the process 400 are illustrated in a particular order, in some embodiments, one or more of the blocks may be executed partially or entirely in parallel, may be executed in a different order than illustrated in FIG. 4, or may be bypassed.

In block 405, the motor controller 135 determines present motor information. For example, as noted above, the motor controller 135 may determine present motor information for the WFS motor 115 based on the received output signals. The determinations may be direct (e.g., determining current from a current sensor or rotational position from a position sensor) or inferred (e.g., determining voltage based on a current sensor output and other known characteristics of the motor 115 or determining rotational position of the rotor based on sensed current or voltage). With reference to FIG. 2, the present motor information may include one or more of rotor position angle of the rotor ($\theta$), rotor rotational velocity ($\omega$), rotor field current (e.g., $I_R$) of the rotor assembly 185, stator field currents (e.g., $I_A$, $I_B$, and $I_C$) of the stator field assembly 180, rotor field voltage (e.g., $V_R$), and stator field voltages (e.g., $V_A$, $V_B$, $V_C$). In some embodiments in which fewer or additional stator phases (i.e., two phases or more than three phases) and/or additional independently controllable rotor fields are provided, the motor controller 135 may further determine currents and/or voltages for each of these additional stator phases and/or rotor fields.

In block 410, the motor controller 135 determines a motor control parameter set based on the present motor information and a rotating reference frame of the motor, wherein the rotating reference frame has independent input channels that decouple an intended output response in a stator D-axis component and a rotor field (R) component of a direct-quadrature-null-rotor (DQNR) reference frame. For example, the rotating reference frame may be an MK reference frame including a magnetizing inductance axis (M-axis), sometimes also referred to as a mutual inductance axis, and a leakage inductance (K-axis). In some embodiments, to determine the motor control parameter set based on the present motor information and the M-axis of the MK reference frame, the motor controller 135 determines desired motor voltages for the motor control parameter set ($V_R$, $V_A$, $V_B$, and $V_C$) based on a magnetizing inductance current ($I_M$), a leakage inductance current ($I_K$), and a quadrature current ($I_Q$) indicated by the present motor information. For example, to determine desired motor voltages for the motor control parameter set ($V_R$, $V_A$, $V_B$, and $V_C$) based on $I_M$, $I_K$, and $I_Q$ indicated by the present motor information, the motor controller 135 may (i) implement the process 500 of FIG. 5 (described further below) and/or (ii) access a lookup table that maps the rotor position angle, the rotor field current, and the stator currents (e.g., $\theta$, $I_R$, $I_A$, $I_B$, and $I_C$) to the desired motor voltages (e.g., $V_R$, $V_A$, $V_B$, and $V_C$). Here, the lookup table is populated based on an MK transform that transforms an input set of example motor currents and an example rotor position angle to an output set including a resultant magnetizing inductance current ($I_M$), a resultant leakage inductance current ($I_K$), and a resultant Q current ($I_Q$).

As another example, the rotating reference frame may be an SM/DM reference frame including a summation mode axis (SM-axis) and a difference mode axis (DM-axis). The summation mode axis represents a sum of the stator D-axis and R field components of the RDQN reference frame and the difference mode axis represents the difference of the stator D-axis and R field components of the RDQN reference frame, on a turn-normalized basis, i.e., amp-turns and volts-per-turn. The turns on the rotor and stator D-axis may be chosen based on physical turn count or an arbitrary value. The MK transform is a specific instance of the SM/DM transform in which the turn count of rotor and stator D-axis are chosen such that the leakage inductance of the two coils are the same. The R component may also be referred to as the rotor D-axis component. In the SM/DM reference frame, the summation mode current ($I_{SM}$), summation mode voltage ($V_{SM}$), difference mode current ($I_{DM}$), and difference mode voltage ($V_{DM}$) may be defined as follows:

$I_{SM}$ = rotor D–axis current ($I_{R\_D}$) + stator D–axis current ($I_{S\_D}$);

$V_{SM}$ = [rotor D–axis voltage ($V_{R\_D}$) + stator D–axis voltage ($V_{S\_D}$)]/2;

$I_{DM}$ = rotor D–axis current ($I_{R\_D}$) − stator D–axis current ($I_{S\_D}$); and $V_{DM}$ = [rotor D–axis voltage ($V_{R\_D}$) − stator D–axis voltage ($V_{S\_D}$)]/2.

Rotor D-axis current ($I_{R\_D}$) may be a measure of the current through the field winding(s) of a phase of the rotor (e.g., as measured by a current sensor or otherwise determined). Rotor D-axis voltage ($V_{R\_D}$) may be a measure of the voltage across the field winding(s) of the phase of the rotor (e.g., as measured by a voltage sensor or otherwise determined). Stator D-axis current ($I_{S\_D}$) may be determined by determining motor currents ($I_A$, $I_B$, and $I_C$) and rotor angle (θ) and applying the DQN transform to these values. Similarly, the stator D-axis voltage ($V_{S\_D}$) may be determined by determining motor voltages ($V_A$, $V_B$, and $V_C$) and rotor angle (θ) and applying the DQN transform to these values. The summation mode (SM) and difference mode (DM) may also be referred to as a common mode and differential mode in the DQNR reference frame.

In some embodiments, to determine the motor control parameter set based on the present motor information and the SM-axis of the SM/DM reference frame, the motor controller 135 determines desired motor voltages for the motor control parameter set including $V_R$, $V_A$, $V_B$, and $V_C$ based on a summation mode current ($I_{SM}$), a difference mode current ($I_{DM}$), and a quadrature current ($I_Q$) indicated by the rotor position angle and the motor currents. For example, to determine desired motor voltages for the motor control parameter set ($V_R$, $V_A$, $V_B$, and $V_C$) based on $I_{SM}$, $I_{DM}$, and $I_Q$ indicated by the present motor information, the motor controller 135 may (i) implement the process 700 of FIG. 7 (described further below) and/or (ii) access a lookup table that maps the rotor position angle, the rotor field current, and the stator currents (e.g., θ, $I_R$, $I_A$, $I_B$, and $I_C$) to the desired motor voltages (e.g., $V_R$, $V_A$, $V_B$, and $V_C$). Here, the lookup table is populated based on an SM/DM transform that transforms an input set of example motor currents and an example rotor position angle to an output set of a resultant summation mode current ($I_{SM}$), difference mode current ($I_{DM}$), and quadrature current ($I_Q$)).

The motor control parameter set may be, for example, a set of control parameters for controlling each phase of the stator assembly 180 (each stator phase) and each independently controllable field of the rotor assembly 185 (each rotor field). For example, the motor control parameter set may include a desired voltage and/or current for each stator phase and for each independently controllable rotor field. As noted above, the motor may include two stator phases, three stator phases, or more stator phases, and may include one rotor phase, two rotor phases, or more rotor phases. The motor controller 135 may map (e.g., with a lookup table) each desired voltage and/or current to a respective duty cycle for a pulse-width modulated (PWM) signal for each power switching element of the stator drive circuit 200 and the rotor drive circuit 205. In some examples, these particular duty cycles for each power switching element are considered the motor control parameter set, or part of the motor control parameter set.

In block 415, the motor controller 135 controls the motor based on the motor control parameter set. For example, in some embodiments, in block 415, the motor controller 135 generates and outputs control signals, based on the motor control parameter set, to the motor drive circuit 150 to drive the WFS motor 115. For example, the control signals may be received by and control each power switching element of the stator drive circuit 200 and the rotor drive circuit 205 to enable, disable, or switch on and off at a particular rate or duty cycle the particular power switching element. In some examples, the motor control parameter set includes the duty cycles for the control signals for each power switching element. In other examples, in block 415, the motor controller 135 translates the motor control parameter set (e.g., with a lookup table or equation) to the particular control signals. For example, the motor control parameter set may include particular values for $V_A$, $V_B$, and $V_C$, which may translate to the six control signals for the stator drive circuit 300, one for each of the switches 305a-f, and a particular value for $V_R$, which may translate to four control signals for the rotor drive circuit 350.

In some embodiments, the process 400 may be executed with the motor 115 implemented as a wound field synchronous motor, a permanent magnet synchronous machine, a hybrid permanent magnet-wound field synchronous machine, or another type of machine. Accordingly, the process 400 may also be referred to as a process for controlling an electric motor or a process for controlling a synchronous motor. In such embodiments in which the motor 115 that is controlled by the process 400 is a permanent magnet synchronous machine, there are less degrees of freedom that exist—for instance, the rotor field is largely fixed by the permanent magnet. In this way, the permanent magnet contributes to M-axis flux (as opposed to a rotor winding where such flux may be actively modulated). That said, the M-axis flux may be represented by the magnet's (or magnets') contribution to the field at the airgap in combination with the stator's relative contribution. With this understanding, the stator may be controlled (e.g., using the processes described herein) to control the M- and K-axes. In some embodiments, in flux linkage space, the magnetomotive force (MMF) of the magnet may represent R in the RDQN to MKQ transformation and in the RDQN to SM/DM transformation, which are described further below (e.g., with respect to FIGS. 5 and 7, respectively).

Figure 5:
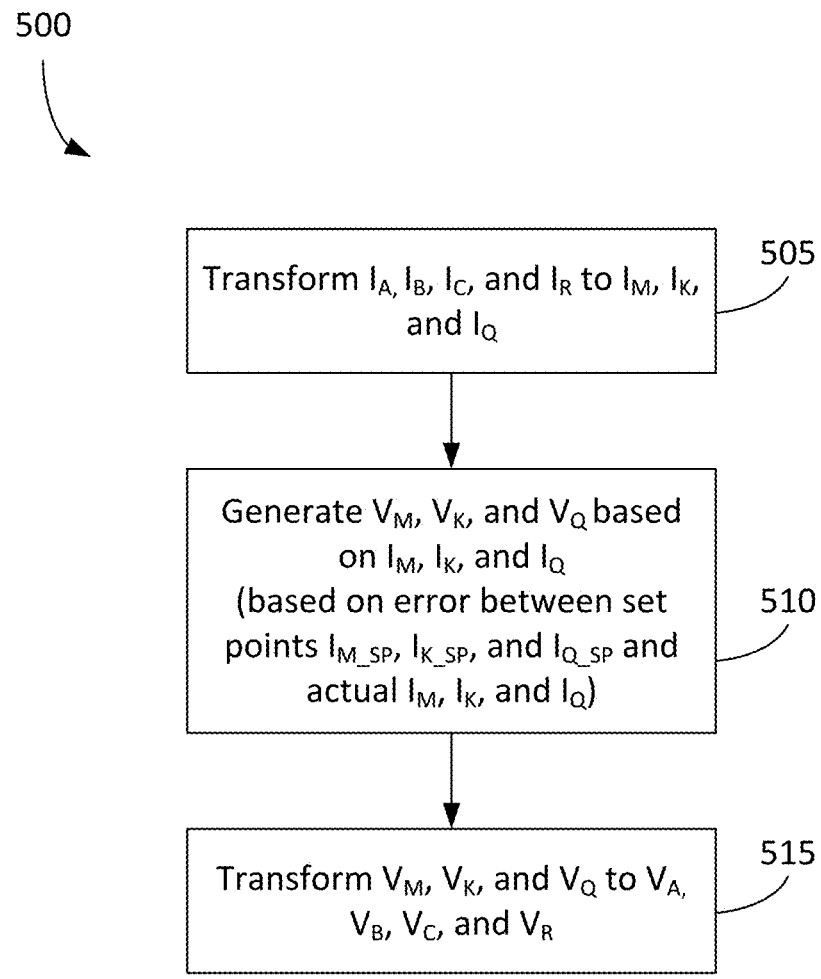
FIG. 5 illustrates a process for controlling a WFS motor based on an MK reference frame according to some embodiments.

FIG. 5 illustrates a process 500 for determining a motor control parameter set based on present motor information and the M-axis of the MK reference frame. In some embodiments, the motor controller 135 implements the process 500 to execute block 410 of FIG. 4. The process 500 is described as being carried out by the motor system 100. However, in some embodiments, the process 500 may be implemented by another motor system. Additionally, although the blocks of the process 500 are illustrated in a particular order, in some embodiments, one or more of the blocks may be executed partially or entirely in parallel, may be executed in a different order than illustrated in FIG. 5, or may be bypassed.

In block 505, the motor controller 135 transforms the present motor information into the MK reference frame. For example, in some embodiments of the process 500, the present motor information may include the rotor position (θ), current of the stator coils ($I_A$, $I_B$, $I_C$), and current of the rotor field winding ($I_R$). The motor controller 135 may then transform, using an MK transform, θ, $I_A$, $I_B$, $I_C$, and $I_R$ to a magnetizing inductance current ($I_M$), a leakage inductance current ($I_K$), and a quadrature current ($I_Q$). For example, the MK transform applied to transform from the A, B, C, D (stationary) reference frame to the (rotating) MKQN reference frame may be:

$$T_{ABCR \to MKQN} = \frac{1}{\sqrt{3}} \times \begin{bmatrix} \cos\theta & \cos\left(\theta - \frac{2\pi}{3}\right) & \cos\left(\theta + \frac{2\pi}{3}\right) & \sqrt{\frac{3}{2}} \\ \cos\theta & \cos\left(\theta - \frac{2\pi}{3}\right) & \cos\left(\theta + \frac{2\pi}{3}\right) & -\sqrt{\frac{3}{2}} \\ -\sqrt{2}\sin\theta & -\sqrt{2}\sin\left(\theta - \frac{2\pi}{3}\right) & -\sqrt{2}\sin\left(\theta + \frac{2\pi}{3}\right) & 0 \\ 1 & 1 & 1 & 0 \end{bmatrix}$$

For example, to determine $I_M$, $I_K$, $I_Q$, and $I_{Null}$, the motor controller 135 may multiply the MK transform by a one dimensional current matrix of $I_A$, $I_B$, $I_C$, and $I_R$ to obtain a one dimensional current matrix in the MK reference frame of $I_M$, $I_K$, $I_Q$, and $I_{Null}$. For example, the motor controller 135 may perform the following calculation:

$$\begin{bmatrix} I_M \\ I_K \\ I_Q \\ I_{Null} \end{bmatrix} = \frac{1}{\sqrt{3}} \times \left( \begin{bmatrix} \cos\theta & \cos\left(\theta - \frac{2\pi}{3}\right) & \cos\left(\theta + \frac{2\pi}{3}\right) & \sqrt{\frac{3}{2}} \\ \cos\theta & \cos\left(\theta - \frac{2\pi}{3}\right) & \cos\left(\theta + \frac{2\pi}{3}\right) & -\sqrt{\frac{3}{2}} \\ -\sqrt{2}\sin\theta & -\sqrt{2}\sin\left(\theta - \frac{2\pi}{3}\right) & -\sqrt{2}\sin\left(\theta + \frac{2\pi}{3}\right) & 0 \\ 1 & 1 & 1 & 0 \end{bmatrix} \times \begin{bmatrix} I_A \\ I_B \\ I_C \\ I_R \end{bmatrix} \right)$$

In some embodiments, rather than a direct transformation as provided above, the present motor information is first transformed to the DQNR reference frame, and then transformed from the DQNR reference frame to the MK reference frame. For example, the MK transform applied to transform from the DQNR reference frame to the MKQN reference frame may be:

$$T_{DQNR \to MKQN} = \frac{1}{\sqrt{2}} \times \begin{bmatrix} 1 & 0 & 0 & 1 \\ 1 & 0 & 0 & -1 \\ 0 & \sqrt{2} & 0 & 0 \\ 0 & 0 & \sqrt{2} & 0 \end{bmatrix}$$

Similarly, to transform D-axis and R-axis values to M-axis and K-axis values, the following transform may be used:

$$T_{DR \to MK} = \frac{1}{\sqrt{2}} \times \begin{bmatrix} 1 & 1 \\ 1 & -1 \end{bmatrix}$$

The MK reference frame may presume that the magnetizing inductance between the M and K axes is zero, or the magnetizing inductance between the M and K axes can be forced to zero by adjusting a stator-to-rotor turns ratio. In an inductively coupled two-coil system, the turns ratio can be selected such that the leakage energy stored in the R and D-axis elements are equal, causing the M and K axis energies to be independent (i.e., no cross-coupling). In other words, if the D-axis has twice the leakage inductance of the rotor in a 1:1 turns ratio (physical), then an equal-energy turns ratio can be found so that the R/D leakage inductance in the model is equal, but the actual (physical) turns ratio will not be 1:1. The adjusted (non-physical) turns ratio may be found and selected using a lookup table, a pre-defined gain factor, or a gain that may be adjusted on-the-fly. In some cases, rotor values based on the adjusted turns ratio may be referred to a R' to distinguish from rotor values (R) that are based on the actual (physical) turns ratio, although this nomenclature is not used in the discussion herein.

To adjust the turns ratio to cause the R/D leakage inductance in the model or controller to be equal, values of the present motor information in the stationary reference frame may be adjusted before being transformed to the MK reference frame. For example, the motor controller 135 may determine the leakage inductance of the rotor R and the leakage inductance of the D-axis, and use those inductance values in a lookup table or equation to determine an adjusted turns ratio. The leakage inductance of the rotor R and D-axis may be, for example, stored as a constant value for the motor in a memory or may be mapped, by a lookup table of the motor controller 135, to determined motor currents or. Alternatively, in some examples, the motor controller 135 may use a pre-defined adjusted turns ratio. Then, the motor controller 135 may adjust the value of each state variable of the present motor information (e.g., $I_A$, $I_B$, $I_C$, and $I_R$) by the adjusted turns ratio to cause the R/D leakage inductance to be equal for purposes of the MK reference frame.

This turns ratio-based adjustment can be done in several ways. For instance, the adjustment may be from the perspective of the rotor reflected to the stator, where the rotor is adjusted by a number (n) of turns. Alternatively, the adjustment can reflect to the rotor and correct for the stator by n turns. In another example, the turns ratio adjustment can correct or adjust to an arbitrary value, and then the motor controller 135 can operate in that referential.

As noted below with respect to block 515, the motor controller 135 may further adjust back based on the physical turns ratio my multiplying determined values by an adjusted turns ratio after transforming back to the stationary reference frame from the MK reference frame.

The present motor information may also include or indicate set point values for each of the axes in the MK reference frame, including a magnetizing inductance set point current ($I_{M\_SP}$), a leakage inductance set point ($I_{K\_SP}$), and a quadrature set point current ($I_{Q\_SP}$). These set point values may be determined as part of the block 405 of FIG. 4. For example, these set point values (also referred to as target values) may be predefined and retrieved from a memory (e.g., the memory 145) as part of the block 405. Alternatively, these set point values may be determined from a motor speed command or motor torque command received from the input/output device 160. That is, the motor controller 135 may receive a motor speed command or motor torque command, and may map the command to set point values using a lookup table or equation that defines the relationship.

In block 510, the motor controller 135 generates a desired MK motor control parameter set in the MK reference frame. The desired MK motor control parameter set includes, for example, a desired voltage for one or more control axes of the MK reference frame, including: a magnetizing inductance voltage ($V_M$), a leakage inductance voltage ($V_K$), and a quadrature voltage ($V_Q$). The motor controller 135 may generate the desired MK motor control parameter set based on respective errors between the set point values ($I_{M\_SP}$, $I_{K\_SP}$, and $I_{Q\_SP}$) and the determined (actual) current values for the MK axes ($I_M$, $I_K$, $I_Q$). For example, when $I_M$ is less than $I_{M\_SP}$, the motor controller 135 may increase the desired M-axis voltage ($V_M$). In other words, in at least some embodiments, the motor controller 135 may implement a regulator that regulates the current values for the MK axes ($I_M$, $I_K$, $I_Q$) to be at approximately the target values ($I_{M\_SP}$, $I_{K\_SP}$, and $I_{Q\_SP}$) by varying the voltage values for the MK axes ($V_M$, $V_K$, $V_Q$)).

In some embodiments, the motor controller 135 implements or includes one or more proportional, integral, derivative (PID) controllers to implement the aforementioned regulation. An example of such PID controllers is provided in FIG. 6, described further below.

In block 515, the motor controller 135 transforms the desired MK motor control parameter set from the MK reference frame back to the stationary reference frame of the motor control parameter set (e.g., the A, B, C, R, θ reference frame). For example, the motor controller 135 may transform the desired voltage for each axis of the MK reference frame ($V_M$, $V_K$, $V_Q$) to $V_A$, $V_B$, $V_C$, and $V_R$, which may serve as the motor control parameter set (referenced in blocks 410 and 415 of FIG. 4). In some embodiments, the motor controller 135 performs the transformation of block 515 with the inverse MK transform, as follows:

$$T_{MKQN \to ABCR} = \frac{1}{\sqrt{3}} \times \begin{bmatrix} \cos\theta & \cos\theta & -\sqrt{2}\sin\theta & 1 \\ \cos\left(\theta - \frac{2\pi}{3}\right) & \cos\left(\theta - \frac{2\pi}{3}\right) & -\sqrt{2}\sin\left(\theta - \frac{2\pi}{3}\right) & 1 \\ \cos\left(\theta + \frac{2\pi}{3}\right) & \cos\left(\theta + \frac{2\pi}{3}\right) & -\sqrt{2}\sin\left(\theta + \frac{2\pi}{3}\right) & 1 \\ \sqrt{\frac{3}{2}} & -\sqrt{\frac{3}{2}} & 0 & 0 \end{bmatrix}$$

For example, to determine $V_A$, $V_B$, $V_C$, and $V_R$, the motor controller may multiply the inverse MK transform by a one dimensional voltage matrix of $V_M$, $V_K$, $V_Q$, and $V_{Null}$ to obtain a one dimensional voltage matrix in the stationary ABCR reference frame of $V_A$, $V_B$, $V_C$, and $V_R$.

In some embodiments, rather than a direct transformation as provided above, the desired MK motor control parameter set is first transformed to the DQNR reference frame, and then transformed from the DQNR reference frame to the stationary reference frame. For example, the MK transform applied to transform from the MKQN reference frame to the DQNR reference frame may be:

$$T_{MKQN \to DQNR} = \frac{1}{\sqrt{2}} \times \begin{bmatrix} 1 & 1 & 0 & 0 \\ 0 & 0 & \sqrt{2} & 0 \\ 0 & 0 & 0 & \sqrt{2} \\ 1 & -1 & 0 & 0 \end{bmatrix}$$

In examples in which the turns ratio is adjusted to cause the R/D leakage inductance in the model to be equal, after the desired MK motor control parameter set is transformed back to the stationary reference frame, the motor controller 135 may further multiply these values (e.g., $V_A$, $V_B$, $V_C$, and $V_R$) by an inverse of the adjusted turns ratio to account for the physical turns ratio of the motor. In other words, the earlier turns ratio adjustment may be undone or reversed.

The description of the process 500 of FIG. 5, including the transforms to and from the MK reference frame, is provided with respect to a WFS motor having three stator phases and a single rotor phase. However, as previously noted, the embodiments described herein are similarly applicable to motors having a different number of stator phases and/or rotor phases. In such embodiments, the transforms to/from the MK reference frame may be updated to account for the additional phases, using similar principals as described herein.

Additionally, in some embodiments, the process 500 may be executed with respect to the motor 115 implemented as a wound field synchronous motor, a permanent magnet synchronous machine, a hybrid permanent magnet-wound field synchronous machine, or another type of synchronous machine. In such embodiments in which the motor 115 that is the subject of the process is a permanent magnet synchronous machine, the M-axis flux may be represented by the permanent magnet's (or magnets') contribution to the field at the airgap in combination with the stator's relative contribution. Accordingly, in some embodiments, in flux linkage space, the magnetomotive force (MMF) of the magnet may represent R in the RDQN to MKQ transformation.

Figure 6:
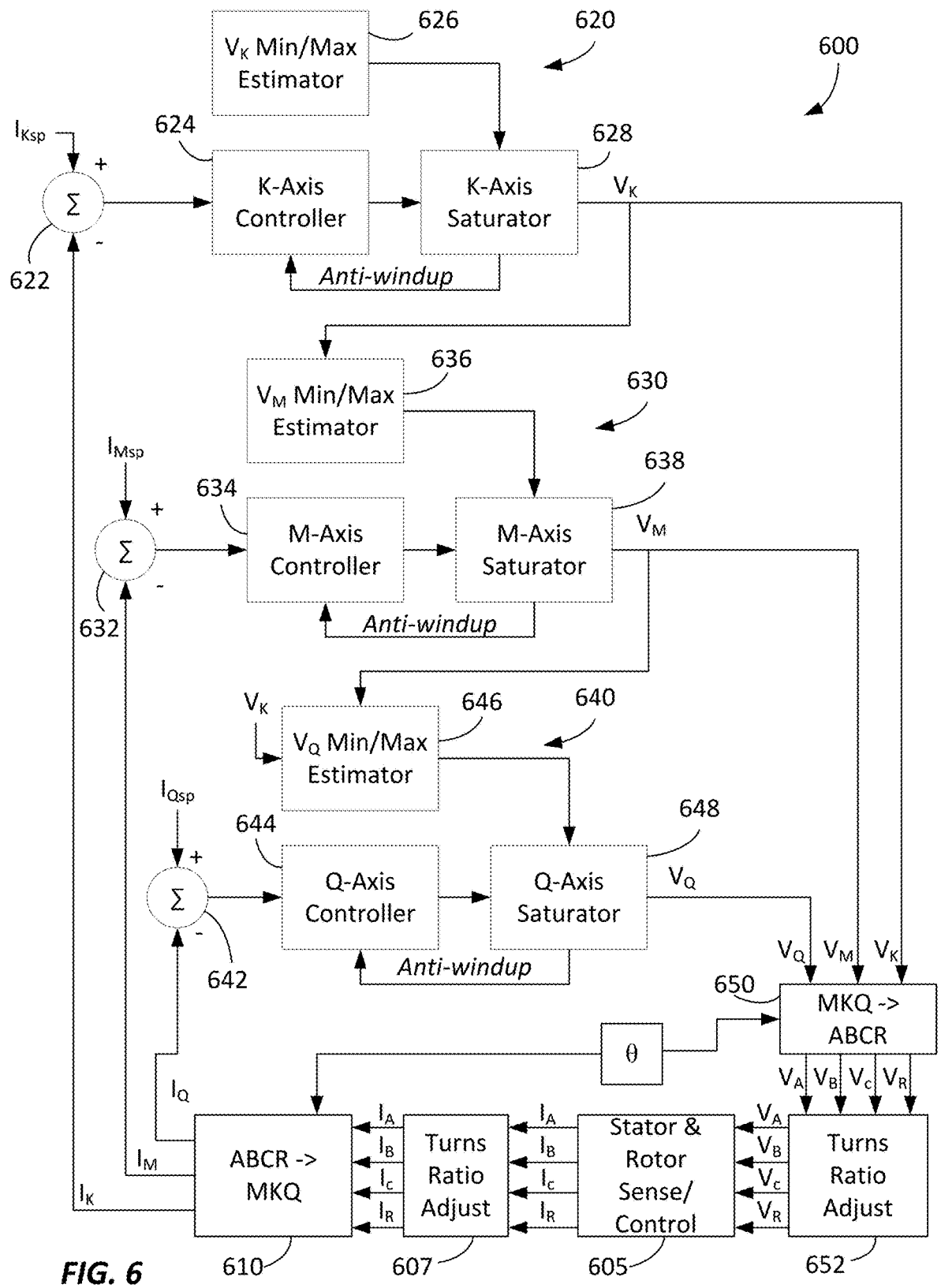
FIG. 6 illustrates a regulator for controlling a WFS motor according to some embodiments.

As noted, FIG. 6 provides an example regulator 600 (e.g., implemented by the motor controller 135) including PID controllers to implement the regulation of block 510 in FIG. 5, which prioritizes available voltage between the K, M, and Q axes (in that order of priority), and including transformation blocks to implement the transformations noted in blocks 505 and 515 as well. In some embodiments, another controller or regulator that prioritizes available voltage between the K, M, and Q axes (in that order of priority) is used to implement the regulation of block 510. Starting in block 605, the motor controller 135 determines the present motor information (e.g., θ, $I_A$, $I_B$, $I_C$, and $I_R$), as described with respect to block 405 of FIG. 4. In some embodiments, in block 607, the motor controller 135 adjusts the turns ratio for the MK reference frame to cause the R/D leakage inductance in the model to be equal, as described above with respect to block 505 of FIG. 5. In transform block 610, the motor controller 135 transforms the present motor information to the MK reference frame, generating $I_Q$, $I_M$, and $I_K$, as described with respect to block 505 of FIG. 5. Each of the $I_Q$, $I_M$, and $I_K$ values are provided to a respective one of a K-axis regulation block 620, an M-axis regulation block 630, and a Q-axis regulation block 640.

The K-axis regulation block 620 includes a K-axis error determination block 622, a K-axis PID controller 624, a $V_K$ min/max estimator 626, and a $V_K$ saturator 628. The M-axis regulation block 630 includes an M-axis error determination block 632, a M-axis PID controller 634, a $V_M$ min/max estimator 636, and a $V_M$ saturator 638. The Q-axis regulation block 640 includes a Q-axis error determination block 642, a Q-axis PID controller 644, a $V_Q$ min/max estimator 646, and a $V_Q$ saturator 648.

The K-axis error determination block 622 receives $I_K$ from transform block 610 and $I_{K\_sp}$ and outputs a K error value indicative of the difference between Ik and $I_{K\_sp}$. The K error value is provided to the K-axis PID controller 624, which provides an initial $V_K$ output to the $V_K$ saturator 628. The $V_K$ saturator 628 also receives a $V_K$ minimum and/or maximum value from the $V_K$ min/max estimator 626. The $V_K$ saturator 628 then outputs the desired $V_K$ based on the initial $V_K$ output and the $V_K$ minimum and/or maximum value(s). For example, when the initial $V_K$ is greater than $V_K$ maximum, the $V_K$ saturator 628 may output the $V_K$ maximum value, and when the initial $V_K$ is less than $V_K$ minimum, the $V_K$ saturator 628 may output the $V_K$ minimum value. When the initial $V_K$ is between $V_K$ minimum and $V_K$ maximum, the $V_K$ saturator 628 may output the initial $V_K$ as $V_K$.

In some embodiments, the $V_K$ min/max estimator 626 may determine the minimum and/or maximum value(s) based on rotor bus voltage, stator bus voltage, and a turns ratio for the motor 115. For example, with drive circuits such as shown in FIG. 3, and $$V_{k\_minimum} \leq V_k \leq V_{k\_maximum}$$

and where $$V_k = \frac{V_D - V_R/N}{\sqrt{2}}$$

the following equation may be used to define the maximum and minimum values of $V_K$:

$$\frac{k * -V_{S\_max} - V_{R\_max}/N}{\sqrt{2}} \leq V_k \leq \frac{k * V_{S\_max} - V_{R\_min}/N}{\sqrt{2}}$$

where k is a gain factor, N is the stator-to-rotor turns ratio, $V_{S\_max}$ is the maximum stator bus voltage, $V_{R\_max}$ is the maximum rotor bus voltage, and $V_{R\_min}$ is the minimum rotor bus voltage. Generally, at least in some embodiments, as the physical turns on the rotor or stator increase (i.e., as the physical turns ratio increases), the M-axis voltage limitation may get tighter. In other embodiments, different voltage bounds may be selected, such as pre-determined voltage bounds.

In some embodiments, the $V_K$ min/max estimator 626 may determine the $V_K$ minimum and/or maximum value based on the stator bus voltage ($V_S$) and the rotor rotational speed ($\omega$).

In some examples, the $V_K$ saturator 628 also outputs an anti-windup signal to the K-axis PID controller 624 to prevent or limit integral windup. For example, the anti-windup signal may cause clamping of an integrator of the K-axis PID controller 624 when integral windup would otherwise occur.

The M-axis error determination block 632 receives IM from transform block 610 and $I_{M\_SP}$ and outputs an M error value indicative of the difference between IM and $I_{M\_SP}$. The M error value is provided to the M-axis PID controller 634, which provides an initial $V_M$ output to the $V_M$ saturator 638. The $V_M$ saturator 638 also receives a $V_M$ minimum and/or maximum value from the $V_M$ min/max estimator 636. The $V_M$ saturator 638 then outputs the desired $V_M$ based on the initial $V_M$ output and the $V_M$ minimum and/or maximum value(s). For example, when the initial $V_M$ is greater than $V_M$ maximum, the $V_M$ saturator 638 may output the $V_M$ maximum value, and when the initial $V_M$ is less than $V_M$ minimum, the $V_M$ saturator 638 may output the $V_M$ minimum value. Further, when the initial $V_M$ is between $V_M$ minimum and $V_M$ maximum, the $V_M$ saturator 638 may output the initial $V_M$ as $V_M$. The $V_M$ min/max estimator 636 may determine the minimum and/or maximum value(s) based on the desired $V_K$ (provided by the $V_K$ regulation block 620), the rotor bus voltage, the stator bus voltage, and the turns ratio for the motor 115. For example, with drive circuits such as shown in FIG. 3, and $$V_{M\_minimum} \leq V_M \leq V_{M\_maximum}$$

and where $$V_m = V_K + \sqrt{2} * \frac{V_R}{N}$$

the following equation may be used to define the maximum and minimum values of $V_M$:

$$V_{K_{sp}} + \frac{\sqrt{2}}{N} * V_{R\_min} \leq V_M \leq V_{K_{sp}} + \frac{\sqrt{2}}{N} * V_{R\_max}$$

where $V_{K_{sp}}$ is a the K-axis voltage set point, N is the stator-to-rotor turns ratio, $V_R\_max$ is the maximum rotor bus voltage, and $V_R\_min$ is the minimum rotor bus voltage.

In some embodiments, the $V_M$ min/max estimator 636 may determine the $V_M$ minimum and/or maximum value based on the stator bus voltage ($V_S$), the rotor rotational speed ($\omega$), and $V_K$.

In some examples, the $V_M$ saturator 638 also outputs an anti-windup signal to the M-axis PID controller 634 to prevent or limit integral windup. For example, the anti-windup signal may cause clamping of an integrator of the M-axis PID controller 634 when integral windup would otherwise occur.

The Q-axis error determination block 642 receives Io from transform block 610 and $I_{Q\_SP}$ and outputs a Q error value indicative of the difference between $I_Q$ and $I_{Q\_SP}$. The Q error value is provided to the Q-axis PID controller 644, which provides an initial $V_Q$ output to the $V_Q$ saturator 648. The $V_Q$ saturator 648 also receives a $V_Q$ minimum and/or maximum value from the $V_Q$ min/max estimator 646. The $V_Q$ saturator 648 then outputs the desired $V_Q$ based on the initial $V_Q$ output and the $V_Q$ minimum and/or maximum value(s). For example, when the initial $V_Q$ is greater than $V_Q$ maximum, the $V_Q$ saturator 648 may output the $V_Q$ maximum value, and when the initial $V_Q$ is less than $V_Q$ minimum, the $V_Q$ saturator 648 may output the $V_Q$ minimum value. When the initial $V_Q$ is between $V_Q$ maximum and $V_Q$ minimum, the $V_Q$ saturator 648 may output the initial $V_Q$ value as $V_Q$. The $V_Q$ min/max estimator 646 may determine the minimum and/or maximum value(s) based on the desired $V_K$ (provided by the $V_K$ regulation block 620), the desired $V_M$ (provided by the $V_M$ regulation block 630), the rotor bus voltage, the stator bus voltage, and the turns ratio for the motor 115. For example, with drive circuits such as shown in FIG. 3, and $$V_{Q\_minimum} \leq V_Q \leq V_{Q\_maximum}$$

the following equation may be used to define the maximum and minimum values of $V_Q$:

$$\sqrt{(V_{S\_max}^2 - V_{D_{sp}}^2)} \leq V_Q \leq \sqrt{(V_{S\_min}^2 - V_{D_{sp}}^2)}$$

where $$V_{D_{sp}} = \frac{V_{M_{sp}} + V_{K_{sp}}}{\sqrt{2}}.$$

Here, $V_{M_{sp}}$ may be an M-axis voltage set point, $V_{D_{sp}}$ may be a D-axis voltage set point, and $V_K$, may be a K-axis voltage set point. These voltage set points, like current set points $I_{K\_sp}$, $I_{M\_sp}$, and $I_{Q\_sp}$, may be predefined and retrieved from a memory or may be determined from a motor speed command or motor torque command received from the input/output device 160.

In some embodiments, the $V_Q$ min/max estimator 646 may determine the $V_Q$ minimum and/or maximum value based on the stator bus voltage ($V_S$), the rotor rotational speed ($\omega$), $V_K$, and $V_M$.

In some examples, the $V_Q$ saturator 648 also outputs an anti-windup signal to the Q-axis PID controller 644 to prevent or limit integral windup. For example, the anti-windup signal may cause clamping of an integrator of the Q-axis PID controller 644 when integral windup would otherwise occur.

As may be seen from the diagram and explanation for FIG. 6, in the regulator 600, the K-axis controls are given priority over the M-axis controls, and the M-axis controls are given priority over the Q-axis controls. Accordingly, first the K-axis regulation block 620 provides $V_K$, then the M-axis regulation block 630 provides $V_M$ (dependent on $V_K$), and then the Q-axis regulation block 640 provides $V_Q$ (dependent on $V_K$ and $V_M$). This priority is selected because the dynamics on the K-axis may be much faster than on the M-axis, and a loss of authority on the K-axis can cause over-current in the system on the stator and the rotor. Additionally, assigning the Q-axis controls to the lowest priority is acceptable because, for example, (i) the stator-to-rotor turns ratio may be generally high, (ii) $V_D$ (and, thus, $V_M$ and $V_K$, which may be used to calculate $V_D$ using the inverse MK transform) may be limited to a relatively narrow range, and (iii) $V_Q$, which is orthogonal to $V_D$, remains relatively free and benefits from a volts-per-turn control authority which is larger than R/D (or M/K) axes.

The min/max estimators 626, 636, and 646 allow a prioritized apportionment of available stator bus voltage among the three axes (K, M, and Q), without falling outside of an acceptable range. In the examples provided above, the $V_K$ min/max estimator 626, $V_M$ min/max estimator 636, and $V_Q$ min/max estimator 646 have a cascaded arrangement, where the selected $V_K$ impacts the minimum and maximum $V_M$, and where the selected $V_K$ and $V_M$ impact the minimum and maximum $V_Q$. The cascaded arrangement can allow for a better utilization of available stator bus voltage among the K, M, and Q control axes. In other embodiments, however, a parallel (non-cascaded) min/max estimator may be provided that receives input parameters (e.g., stator bus voltage ($V_S$), current (e.g., $I_K$, $I_M$, and $I_Q$), and/or rotor rotational speed ($\omega$)) and determines maximum and minimum values for $V_K$, $V_M$, and $V_Q$. The parallel min/max estimator may use a lookup table or perform a real-time calculation using the input parameters to generate the output maximum and minimum values. The parallel min/max estimator may still prioritize the K-axis and M-axis over the Q-axis, and the K-axis over the M-axis (e.g., by providing larger voltage range or higher maximum voltage values for the higher priority axes). The parallel min-max estimator may further provide the maximum and minimum values to the respective K, M, and Q-axis saturators 628, 638, and 648, similar to the cascaded estimators.

In a transform block 650, the motor controller 135 transforms the desired MK motor control parameter set from the MK reference frame (e.g., the desired $V_Q$, $V_M$, and $V_K$) back to the stationary reference frame of the motor control parameter set (e.g., the A, B, C, R, θ reference frame), as described with respect to block 515 of FIG. 5. In some embodiments, in block 652, the motor controller 135 may further multiply these values (e.g., $V_A$, $V_B$, $V_C$, and $V_R$) by the adjusted turns ratio to account for the physical turns ratio of the motor. Returning to block 605, the motor controller 135 may then control the WFS motor 115 (e.g., via the stator drive circuit and the rotor drive circuit) using the motor control parameter set provided by the block 652, such as described with respect to block 415 of FIG. 4.

Each block of FIG. 6 may be one or more hardware circuits or software blocks (e.g., stored in the memory 145 and executed by the electronic processor 140) of the motor controller 135.

In some embodiments, one or more of the blocks of the regulator 600 are implemented with one or more lookup tables, rather than circuits or processing elements that perform real-time computation. For example, lookup tables may replace one or more of the blocks 610, 620, 630, 640, and 650, individually or in combination. For example, in some embodiments of the block 610, rather than performing a transform by applying the MK transform to the present motor information to calculate the transformed values (e.g., $I_Q$, $I_M$, and $I_K$) in the MK reference frame in real time, the present motor information is provided to a lookup table pre-loaded with the transformed values mapped to potential values for the present motor information. In other words, the present motor information is mapped to transformed values using a lookup table that is pre-populated. The lookup table may be pre-populated by taking sets of potential values for present motor information, performing the MK transform on each set, and storing the resulting transformed values in the lookup table with an association to the set of potential values used to generate the particular resulting transformed values. Additional memory space may be used to accommodate the lookup table, but the transformation time may be reduced relative to real-time computation using the MK transform. Similarly, in some embodiments of the block 650, rather than performing a transform by applying the inverse MK transform to the desired MK motor control parameter set (e.g., the desired $V_Q$, $V_M$, and $V_K$) in the MK reference frame to the stationary reference frame in real time, the desired MK motor control parameter set is provided to a lookup table pre-loaded with the transformed values (e.g., $V_A$, $V_B$, $V_C$, and $V_R$) mapped to potential values for the desired MK motor control parameter set. Similarly, each of the regulation blocks 620, 630, and 640 may be individually replaced with lookup tables, or collectively replaced with a lookup table, that map potential inputs of the respective blocks to the desired MK motor control parameter set (e.g., the desired $V_Q$, $V_M$, and $V_K$).

As noted with respect to block 410 of FIG. 4, in some embodiments, the motor controller 135 may access a lookup table that maps the rotor position angle, the rotor field current, and the stator currents (e.g., θ, $I_R$, $I_A$, $I_B$, and $I_C$) to the desired motor voltages (e.g., $V_R$, $V_A$, $V_B$, and $V_C$), wherein the lookup table is populated based on an MK current transform that transforms an input set of example motor currents and an example rotor position angle to an output set of a resultant magnetizing inductance current ($I_M$), a resultant leakage inductance current ($I_K$), and a resultant Q current ($I_Q$). For example, the regulator 600 may be replaced with a lookup table that maps the present motor information (e.g., θ, $I_R$, $I_A$, $I_B$, and $I_C$) to the motor control parameter set (e.g., to $V_A$, $V_B$, $V_C$, and $V_R$ in the stationary reference frame). Here, the lookup table may be pre-populated by providing sets of potential values for present motor information to a regulator that relies on the MK transform, such as the regulator 600, and storing the resulting motor control parameter set in the lookup table with an association to the set of potential values used to generate the particular resulting set.

In the above examples, the lookup table(s) may be stored in the memory 145 of the motor controller 135 or may be implemented as a separate hardware (or integrated circuit (IC)) of the electronic processor 140. In some examples, the lookup tables are multi-input multi-output (MIMO) tables of the memory 145 or of ICs of the electronic processor 140.

Accordingly, as described above, block 410 of FIG. 4 may be implemented where the rotating reference frame is an MK reference frame and, for example, the motor controller 135 implements the process 500 of FIG. 5 or accessing a lookup table. Further, as noted above, block 410 of FIG. 4 may be implemented where the rotating reference frame is the SM/DM reference frame and, for example, the motor controller 135 implements the process 700 of FIG. 7 or accessing a lookup table.

Figure 7:
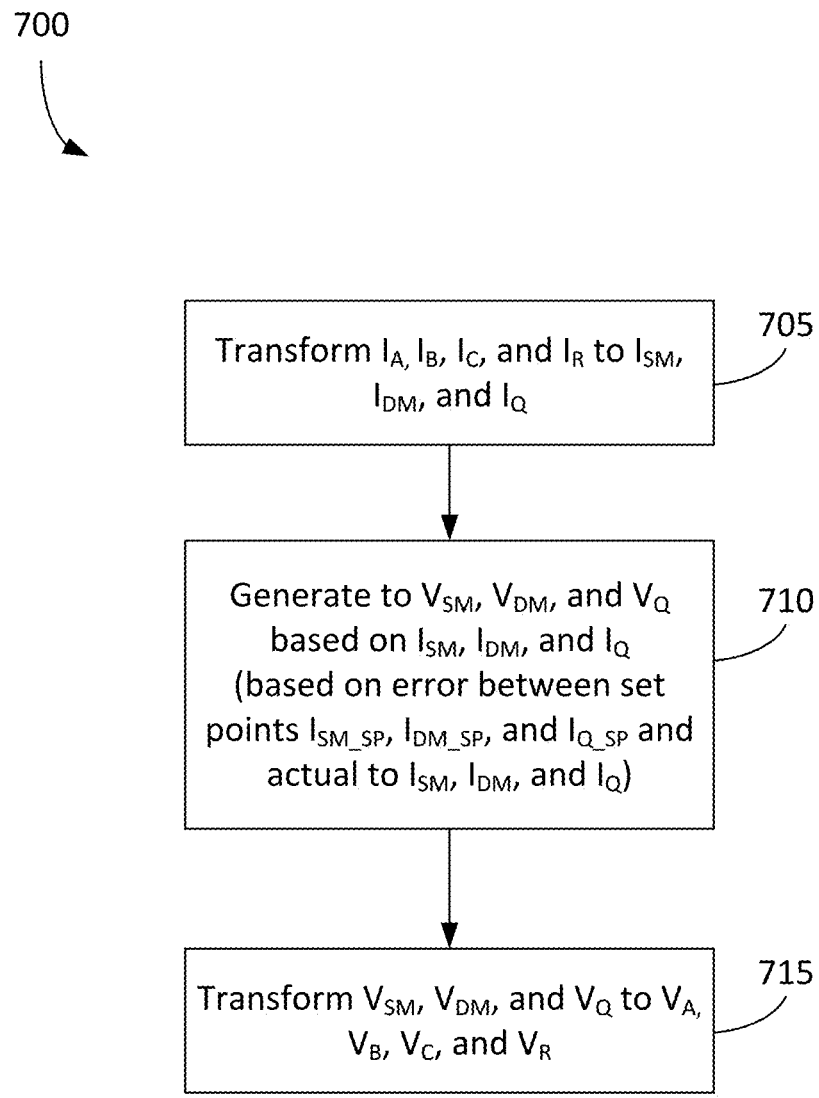
FIG. 7 illustrates a process for controlling a WFS motor based on an SM/DM reference frame according to some embodiments.

Turning to FIG. 7, the process 700 provides for determining a motor control parameter set based on present motor information and an SM/DM reference frame that has independent input channels that decouple an intended output response in the stator D-axis component and rotor (R) component. In some embodiments, the motor controller 135 implements the process 700 to execute block 410 of FIG. 4. The process 700 is described as being carried out by the motor system 100. However, in some embodiments, the process 700 may be implemented by another motor system. Additionally, although the blocks of the process 700 are illustrated in a particular order, in some embodiments, one or more of the blocks may be executed partially or entirely in parallel, may be executed in a different order than illustrated in FIG. 7, or may be bypassed.

In block 705, the motor controller 135 transforms the present motor information into the SM/DM reference frame. For example, in some embodiments of the process 500, the present motor information may include the rotor position (θ), current of the stator coils ($I_A$, $I_B$, $I_C$), and current of the rotor field winding ($I_R$). The motor controller 135 may then transform, using an SM/DM transform, θ, $I_A$, $I_B$, $I_C$, and $I_R$ to a summation mode current ($I_{SM}$), a difference mode current ($I_{DM}$), and a quadrature current ($I_Q$).

For example, the SM/DM transform that is applied to transform from the stationary ABCR reference frame to the (rotating) SM/DM reference frame (and, more particularly, to the SM, DM, Q, Null reference frame) may be:

$$T_{ABCR \to SMDMQN} = \alpha \times \begin{bmatrix} 1 & \cos(\theta) & \cos(\theta-120) & \cos(\theta-240) \\ \sqrt{\left(\frac{3}{2}\right)} & -\cos(\theta) & -\cos(\theta-120) & -\cos(\theta-240) \\ 0 & \sin(\theta) & \sin(\theta-120) & \sin(\theta-240) \\ 0 & \frac{1}{\sqrt{2}} & \frac{1}{\sqrt{2}} & \frac{1}{\sqrt{2}} \end{bmatrix},$$

where alpha (α)=1 for the SM/DM reference frame.

For example, to determine $I_{SM}$, $I_{DM}$, $I_Q$, and $I_{Null}$, the motor controller 135 may multiply a one dimensional current matrix of $I_A$, $I_B$, $I_C$, and $I_R$, by the SM/DM transform to obtain a one dimensional current matrix in the SM/DM reference frame of $I_{SM}$, $I_{DM}$, $I_Q$, and $I_{Null}$. For example, the motor controller 135 may perform the following calculation:

$$\begin{bmatrix} I_{SM} \\ I_{DM} \\ I_Q \\ I_{Null} \end{bmatrix} = \left( \begin{bmatrix} 1 & \cos(\theta) & \cos(\theta-120) & \cos(\theta-240) \\ \sqrt{\left(\frac{3}{2}\right)} & -\cos(\theta) & -\cos(\theta-120) & -\cos(\theta-240) \\ 0 & \sin(\theta) & \sin(\theta-120) & \sin(\theta-240) \\ 0 & \frac{1}{\sqrt{2}} & \frac{1}{\sqrt{2}} & \frac{1}{\sqrt{2}} \end{bmatrix} \right) \times \begin{bmatrix} I_A \\ I_B \\ I_C \\ I_R \end{bmatrix}$$

In some embodiments, rather than a direct transformation as provided above, the present motor information is first transformed to the RDQN reference frame, and then transformed from the RDQN reference frame to the SM/DM reference frame.

The present motor information may also include or indicate set point values for each of the axes in the SM/DM reference frame, including a summation mode set point current ($I_{SM\_SP}$), a difference mode set point current ($I_{DM\_SP}$), and a quadrature set point current ($I_{Q\_SP}$). These set point values may be determined as part of the block 405 of FIG. 4. For example, these set point values (also referred to as target values) may be predefined and retrieved from a memory (e.g., the memory 145) as part of the block 405. Alternatively, these set point values may be determined from a motor speed command or motor torque command received from the input/output device 160. That is, the motor controller 135 may receive a motor speed command or motor torque command, and may map the command to set point values using a lookup table or equation that defines the relationship.

In block 710, the motor controller 135 generates a desired SM/DM motor control parameter set in the SM/DM reference frame. The desired SM/DM motor control parameter set includes, for example, a desired voltage for one or more control axes of the SM/DM reference frame, including: a summation mode voltage ($V_{SM}$), a difference mode voltage ($V_{DM}$), and a quadrature voltage ($V_Q$). The motor controller 135 may generate the desired SM/DM motor control parameter set based on respective errors between the set point values ($I_{SM\_SP}$, $I_{DM\_SP}$, and $I_{Q\_SP}$) and the determined (actual) current values for the SM/DM axes ($I_{SM}$, $I_{DM}$, $I_Q$). For example, when $I_{SM}$ is less than $I_{SM\_SP}$, the motor controller 135 may increase the desired SM-axis voltage ($V_{SM}$). In other words, in at least some embodiments, the motor controller 135 may implement a regulator that regulates the current values for the SM/DM axes ($I_{SM}$, $I_{DM}$, $I_Q$) to be at approximately the set point values ($I_{SM\_SP}$, $I_{DM\_SP}$, and $I_{Q\_SP}$) by varying the voltage values for the SM/DM axes ($V_{SM}$, $V_{DM}$, $V_Q$)).

In some embodiments, the motor controller 135 implements or includes one or more proportional, integral, derivative (PID) controllers to implement the aforementioned regulation. For example, the system 600 of FIG. 6 may be modified for the SM/DM reference frame by substituting the SM-axis elements (e.g., $I_{SM}$ and $I_{SM\_SP}$) for the M-axis elements (e.g., $I_M$ and $I_{M\_SP}$), and the DM-axis element for the K-axis elements, and by replacing the MK transform block 610 and inverse MK transform block 650 with an SM/DM transform block and inverse SM/DM transform block, respectively. Accordingly, in these embodiments, regulation block 620 may be a SM-axis regulation block and regulation block 630 may be a DM-axis regulation block.

In block 715, the motor controller 135 transforms the desired SM/DM motor control parameter set from the SM/DM reference frame back to the stationary reference frame of the motor control parameter set. For example, the motor controller 135 may transform the desired voltage for each axis of the SM/DM reference frame ($V_{SM}$, $V_{DM}$, $V_Q$) to $V_A$, $V_B$, $V_C$, and $V_R$, which may serve as the motor control parameter set (referenced in blocks 410 and 415 of FIG. 4). In some embodiments, the motor controller 135 performs the transformation of block 715 with the inverse SM/DM transform, as follows:

$$T_{CMDMQN \to ABCR} = \alpha \times \begin{bmatrix} 1 & \sqrt{\left(\frac{3}{2}\right)} & 0 & 0 \\ \cos(\theta) & -\cos(\theta) & \sin(\theta) & \frac{1}{\sqrt{2}} \\ 0 & -\cos(\theta-120) & \sin(\theta-120) & \frac{1}{\sqrt{2}} \\ 0 & -\cos(\theta-240) & \sin(\theta-240) & \frac{1}{\sqrt{2}} \end{bmatrix},$$

where alpha ($\alpha$)=1 for the SM/DM reference frame.

For example, to determine $V_A$, $V_B$, $V_C$, and $V_R$, the motor controller 135 may multiply a one dimensional voltage matrix of $V_{SM}$, $V_{DM}$, $V_Q$, and $V_{Null}$, by the inverse SM/DM transform to obtain a one dimensional voltage matrix in the stationary ABCR reference frame of $V_A$, $V_B$, $V_C$, and $V_R$.

In some embodiments, rather than a direct transformation as provided above, the desired SM/DM motor control parameter set is first transformed to the RDQN reference frame, and then transformed from the RDQN reference frame to the stationary reference frame.

As noted with respect to block 410 of FIG. 4, in some embodiments, the motor controller 135 may access a lookup table that maps the rotor position angle, the rotor field current, and the stator currents (e.g., $\theta$, $I_R$, $I_A$, $I_B$, and $I_C$) to the desired motor voltages (e.g., $V_R$, $V_A$, $V_B$, and $V_C$), wherein the lookup table is populated based on an SM/DM transform that transforms an input set of stationary reference frame components (e.g., $\theta$, $I_R$, $I_A$, $I_B$, and $I_C$) to an output set of an SM/DM components (e.g., $I_{SM}$, $I_{DM}$, and $I_Q$). For example, a real-time regulator for controlling SM/DM components (e.g., similar to the regulator 600 but for the SM/DM reference frame) may be replaced with a lookup table that maps the present motor information (e.g., $\theta$, $I_R$, $I_A$, $I_B$, and $I_C$) to the motor control parameter set (e.g., to $V_A$, $V_B$, $V_C$, and $V_R$ in the stationary stator reference frame). Here, the lookup table may be pre-populated by providing sets of potential values for present motor information to a regulator that relies on the SM/DM transform, and storing the resulting motor control parameter set in the lookup table with an association to the set of potential values used to generate the particular resulting set.

In the above examples, the lookup table(s) may be stored in the memory 145 of the motor controller 135 or may be implemented as a separate hardware (or integrated circuit (IC)) of the electronic processor 140. In some examples, the lookup tables are multi-input multi-output (MIMO) tables of the memory 145 or of ICs of the electronic processor 140.

In some embodiments, a MIMO controller 800 may be a portion of the motor controller 135 or serve as the motor controller 135, and control the motor 115 based on the MK reference frame or SM/DM reference frame. The MIMO controller 800 may be an application specific integrated circuit (ASIC) or field programmable gate array (FPGA), for example, that is designed and configured to implement the functionality of the process 400 or a subset thereof. For example, in some embodiments, the MIMO controller 800 may incorporate the regulator 600 for the MK reference frame, or as modified for the SM/DM reference frame. In some embodiments, the MIMO controller 800 may include one or more lookup tables, as described above, to implement the process 400 or a subset thereof. For example, the lookup tables may be pre-populated to map present motor information (e.g., such as determined in block 405) to a motor control set (such as applied in block 415) based on the MK transform and inverse MK transform or based on the SM/DM transform and inverse SM/DM transform. In some embodiments, the MIMO controller 800 includes a combination of real-time computation (e.g., of transforms or regulator controls) and lookup tables (e.g., for the remaining transforms or regulator controls not computed in real time). For example, with reference to FIG. 6, in some embodiments, the transforms 610 and 650 may be implemented by lookup tables, while the regulator blocks 620, 630, and 640 include circuits for real-time computation. Further, within continued reference to FIG. 6, in other embodiments, the transforms 610 and 650 may be implemented with real-time computation, whereas the regulator blocks 620, 630, and 640 are implemented with lookup tables. Various other combinations of computation circuits and lookup tables may be used to implement the functionality of the MIMO controller 800 in other embodiments.

As illustrated, the MIMO controller 800 receives present motor information ($\omega$, $\theta$, $I_R$, $I_A$, $I_B$, and $I_C$) and outputs a motor control set including ($V_A$, $V_B$, $V_C$, and $V_R$). In some embodiments, the motor control set output by the MIMO controller 800 includes PWM signals or other control signals for directly controlling the stator drive circuit 200 and rotor drive circuit 205. In still other embodiments, the present motor information may include one or more voltage signals in the stationary reference frame, in addition to or instead of the current signals. Additionally, in some embodiments, the motor control set output may include one or more current signals in the stationary reference frame, in addition to or instead of the voltage signals. In some embodiments, the MIMO controller 800 may infer one or more of the inputs from other inputs (e.g., rotational speed ($\omega$) based on rotational position ($\theta$) over time) rather than receiving an explicit value indicative of each listed input.

Additionally, the particular transform matrices provided above for going from the stationary reference frame to the MK or SM/DM reference frame, and for going from the MK or SM/DM reference frame to the stationary reference frame, are provided for a WFS motor having a three-phase stator and single phase rotor. However, this is just a particular example and, in some embodiments, these concepts and transforms are extended and apply to WFS motors having two-phase stators, stators with more than three phases, and/or rotors with two or more phases based on similar principals. In such embodiments, the transform matrices are updated to account for the additional phases. For example, the section that follows provides additional description of the principals and calculations underlying the transforms for the MK and SM/DM reference frames provided above. Additionally, following the description of FIGS. 9A-F below, an example transform is provided for transforming from the stationary reference frame to an MK reference frame for a motor having a six phase stator and four phase rotor.

Although the process 700 may be executed with respect to the motor 115 implemented as a wound field synchronous motor, the process 700 may also be executed with respect to the motor 115 in other forms, such as implemented as a permanent magnet synchronous machine or a hybrid permanent magnet-wound field synchronous motor that has a rotor with both a wound field and a permanent magnet. In such embodiments in which the motor 115 that is the subject of the process is a permanent magnet synchronous machine, in flux linkage space, the magnetomotive force (MMF) of the magnet may represent R in the RDQN to SM/DM transformation.

Rotor/Stator D-Axis Flux Linkage Decoupling

A WFS motor, such as the WFS motor 115, may have a strong coupling between rotor flux linkage and current in both the rotor field and in the stator D-axis, as well as between the stator D-axis flux linkage and the current in both the rotor field and in the stator D-axis. Generally, flux linkage may refer to magnetic flux through a coil (e.g., a rotor or stator winding) multiplied by the number of turns of the coil that the flux passes through. This strong R-D coupling allows creation of an SM/DM sub-system of two components in the DQNR reference frame having four components overall (D, Q, N, and R).

Treating the R-D coupling in isolation, the following equation may be provided, where $\lambda_R$ and $\lambda_D$ represent flux linkages for the rotor field and stator D-axis, respectively, $L_R$ and $L_D$ represent self inductances for the rotor and stator D-axis, respectively, and $L_{R,D}$ represents magnetizing inductance of the rotor and stator D-axis:

$$\begin{bmatrix} \lambda_R \\ \lambda_D \end{bmatrix} = \begin{bmatrix} L_R & L_{R,D} \\ L_{R,D} & L_D \end{bmatrix} \begin{bmatrix} i_R \\ i_D \end{bmatrix}$$

The self-inductance of the rotor field and of the stator D-axis can be broken down into magnetizing and leakage inductances, where the leakage inductances ($L_{R,R}$ and $L_{D,D}$) are much smaller than the associated magnetizing inductances ($L_{R,D}$) in most cases:

$$L_R = L_{R,D} + L_{R,R}, L_{R,R} \ll L_{R,D}$$

$$L_D = L_{R,D} + L_{D,D}, L_{D,D} \ll L_{R,D}$$

$$\begin{bmatrix} \lambda_R \\ \lambda_D \end{bmatrix} = \begin{bmatrix} L_{R,D} + L_{R,R} & L_{R,D} \\ L_{R,D} & L_{R,D} + L_{D,D} \end{bmatrix} \begin{bmatrix} i_R \\ i_D \end{bmatrix}$$

This results in the following matrix:

$$\begin{bmatrix} \lambda_R \\ \lambda_D \end{bmatrix} \approx \begin{bmatrix} L_{R,D} & L_{R,D} \\ L_{R,D} & L_{R,D} \end{bmatrix} \begin{bmatrix} i_R \\ i_D \end{bmatrix} \approx L_{R,D} \begin{bmatrix} 1 & 1 \\ 1 & 1 \end{bmatrix} \begin{bmatrix} i_R \\ i_D \end{bmatrix}$$

In a two degree-of-freedom system, the SM/DM transformation matrix may be of the form $$T = \begin{bmatrix} 1 & 1 \\ 1 & -1 \end{bmatrix}$$

and this matrix can be used to transform the R and stator D-axis components as follows:

$$\begin{bmatrix} x_{SM} \\ x_{DM} \end{bmatrix} = T \begin{bmatrix} x_R \\ x_D \end{bmatrix}$$

The inverse transformation is $$T^{-1} = \frac{1}{2}\begin{bmatrix} 1 & 1 \\ 1 & -1 \end{bmatrix}$$

The inverse transformation is similar to the forward transformation, and, by using a magnitude-preserving choice of coefficients, the SM/DM transformation matrix for degree two is its own inverse. More generally, for degrees of freedom greater than or equal to three, the transpose of the transformation matrix is the inverse. For example:

$$\begin{bmatrix} i_R \\ i_D \end{bmatrix} = T^{-1}\begin{bmatrix} i_{SM} \\ i_{DM} \end{bmatrix} = \frac{1}{2}\begin{bmatrix} 1 & 1 \\ 1 & -1 \end{bmatrix}\begin{bmatrix} i_{SM} \\ i_{DM} \end{bmatrix}$$

$$\begin{bmatrix} \lambda_R \\ \lambda_D \end{bmatrix} = \frac{1}{2}\begin{bmatrix} L_{R,D} + L_{R,R} & L_{R,D} \\ L_{R,D} & L_{R,D} + L_{D,D} \end{bmatrix}\begin{bmatrix} 1 & 1 \\ 1 & -1 \end{bmatrix}\begin{bmatrix} i_{SM} \\ i_{DM} \end{bmatrix}$$

$$\begin{bmatrix} \lambda_R \\ \lambda_D \end{bmatrix} = \frac{1}{2}\begin{bmatrix} 2L_{R,D} + L_{R,R} & L_{R,R} \\ 2L_{R,D} + L_{D,D} & -L_{D,D} \end{bmatrix}\begin{bmatrix} i_{SM} \\ i_{DM} \end{bmatrix}$$

$$\begin{bmatrix} \lambda_{SM} \\ \lambda_{DM} \end{bmatrix} = \begin{bmatrix} \lambda_R \\ \lambda_D \end{bmatrix} = \begin{bmatrix} 1 & 1 \\ 1 & -1 \end{bmatrix}\begin{bmatrix} \lambda_R \\ \lambda_D \end{bmatrix}$$

$$\begin{bmatrix} \lambda_{SM} \\ \lambda_{DM} \end{bmatrix} = \frac{1}{2}\begin{bmatrix} 1 & 1 \\ 1 & -1 \end{bmatrix}\begin{bmatrix} 2L_{R,D} + L_{R,R} & L_{R,R} \\ 2L_{R,D} + L_{D,D} & -L_{D,D} \end{bmatrix}\begin{bmatrix} i_{SM} \\ i_{DM} \end{bmatrix}$$

$$\begin{bmatrix} \lambda_{SM} \\ \lambda_{DM} \end{bmatrix} = \frac{1}{2}\begin{bmatrix} 4L_{R,D} + (L_{R,R} + L_{D,D}) & L_{R,R} - L_{D,D} \\ L_{R,R} - L_{D,D} & L_{D,D} + L_{R,R} \end{bmatrix}\begin{bmatrix} i_{SM} \\ i_{DM} \end{bmatrix}$$

In light of the above, a new inductance matrix can be formulated, wherein $$L_{SM} = 2L_{R,D} + \frac{1}{2}(L_{R,R} + L_{D,D}))$$

$$L_{SM,DM} = L_{R,R} - L_{D,D}$$

$$L_{DM} = \frac{1}{2}(L_{D,D} + L_{R,R}))$$

$$L_{MODE} = \begin{bmatrix} L_{SM} & L_{SM,DM} \\ L_{SM,DM} & L_{DM} \end{bmatrix}$$

Since both stator and rotor leakage inductances are small positive numbers of approximately the same magnitude, the off-diagonal terms are much smaller than the diagonal terms, meaning that there is little cross-coupling.

The MK reference frame stems from the scenario where the rotor and stator D-axis leakage inductances are approximately equal, causing the matrix to simplify as:

$$L_{R,R} \approx L_{D,D} \rightarrow \begin{array}{l} L_{DM} = 2L_{R,R} \\ L_{C,D} = 0 \end{array}$$

Additionally, to use the MK reference frame, a controller (e.g., the controller 135) may artificially enforce an equal rotor and stator D-axis leakage inductance through a non-physical turns ratio, for example, as described above with respect to FIG. 6. In turn, independent M-axis and K-axis controllers may reject significant disturbances in the motor system. Additionally, for a motor system with two coupled inductors (e.g., tightly or highly coupled inductors), the particular determination of turns ratio and the two leakage inductances has a degree of freedom that can be used to compensate.

In the extended case, of the RDQ Null representation, the following sub-matrix can be substituted in:

$$\begin{bmatrix} \lambda_R \\ \lambda_D \\ \lambda_Q \\ \lambda_\phi \end{bmatrix} = \begin{bmatrix} L_R & L_{R,D} & L_{R,Q} & L_{R,\phi} \\ L_{R,D} & L_D & L_{D,Q} & L_{D,\phi} \\ L_{R,Q} & L_{D,Q} & L_Q & L_{Q,\phi} \\ L_{R,\phi} & L_{D,\phi} & L_{Q,\phi} & L_\phi \end{bmatrix} \begin{bmatrix} i_R \\ i_D \\ i_Q \\ i_\phi \end{bmatrix}$$

$$\begin{bmatrix} \lambda_{SM} \\ \lambda_{DM} \\ \lambda_Q \\ \lambda_\phi \end{bmatrix} = \begin{bmatrix} L_{SM} & L_{SM,DM} & L_{SM,Q} & L_{SM,\phi} \\ L_{SM,DM} & L_{DM} & L_{DM,Q} & L_{DM,\phi} \\ L_{SM,Q} & L_{DM,Q} & L_Q & L_{Q,\phi} \\ L_{SM,\phi} & L_{DM,\phi} & L_{Q,\phi} & L_\phi \end{bmatrix} \begin{bmatrix} i_{SM} \\ i_{DM} \\ i_Q \\ i_\phi \end{bmatrix}$$

Taking approximations from a WFS motor, there is very low magnetizing inductance between the rotor and stator Q- or Null-axes. Similarly, the stator D-axis magnetizing inductance with Q and Null-axes are also quite small. Accordingly, the motor system 100 may approximate these terms to be zero to simplify the inductance matrices. For example, the RDQ Null space matrix may be as follows:

$$\begin{bmatrix} \lambda_R \\ \lambda_D \\ \lambda_Q \\ \lambda_\phi \end{bmatrix} = \begin{bmatrix} L_R & L_{R,D} & 0 & 0 \\ L_{R,D} & L_D & 0 & 0 \\ 0 & 0 & L_Q & 0 \\ 0 & 0 & 0 & L_\phi \end{bmatrix} \begin{bmatrix} i_R \\ i_D \\ i_Q \\ i_\phi \end{bmatrix}$$

In this matrix, the RDQ Null reference frame provides a nearly decoupled system, with the exception of the R and D components.

In the MK reference frame, the matrix is diagonalized, where the M-axis flux linkage is decoupled from the K-axis current, and the K-axis flux linkage is decoupled from the M-axis current, as shown in the following matrix:

$$\begin{bmatrix} \lambda_M \\ \lambda_K \\ \lambda_Q \\ \lambda_\phi \end{bmatrix} = \begin{bmatrix} L_M & 0 & 0 & 0 \\ 0 & L_K & 0 & 0 \\ 0 & 0 & L_Q & 0 \\ 0 & 0 & 0 & L_\phi \end{bmatrix} \begin{bmatrix} i_M \\ i_K \\ i_Q \\ i_\phi \end{bmatrix}$$

As shown, the MK reference frame provides a decoupled view, and control, of the motor system through the stator and rotor magnetic fields (which is conventionally viewed in the RD space). This provides independent input controls, or input channels, for a desired, decoupled output response of the machine parameters (e.g., inductances, currents, flux linkages, etc, and associated control thereof).

Accordingly, the SM/DM and the MK transformations entirely or substantially eliminate cross-coupling between the R and D-axis components. For example, a change in R may induce a change of less than 1%, 5%, 10%, or 20% in the D-axis, and a change in the D-axis may induce a change of less than 1%, 5%, 10%, or 20% in R. Thus, the MK reference frame and the SM/DM reference frame provide independent input channels that decouple an intended output response in the D-axis component and rotor field (R) component of the DQNR reference frame.

Additionally, the MK transformation illustrated above is normed and power invariant, meaning the magnitude of the state variables (e.g., voltages and/or currents) are preserved throughout the transform. The SM/DM transformation illustrated above is not normed and, accordingly, the magnitude of state variables may not be preserved throughout the transform.

Figure 9A:
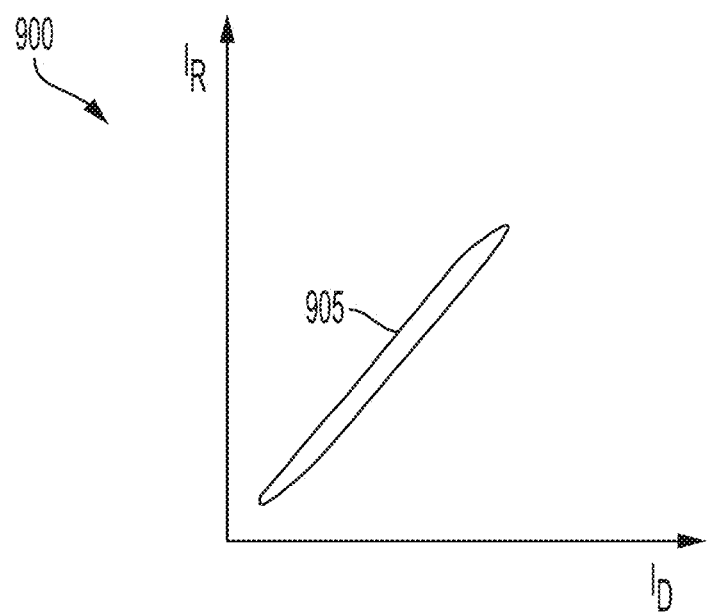
FIGS. 9A-B illustrate graphs of rotor current versus stator D-axis current for different reference frames.
Figure 9B:
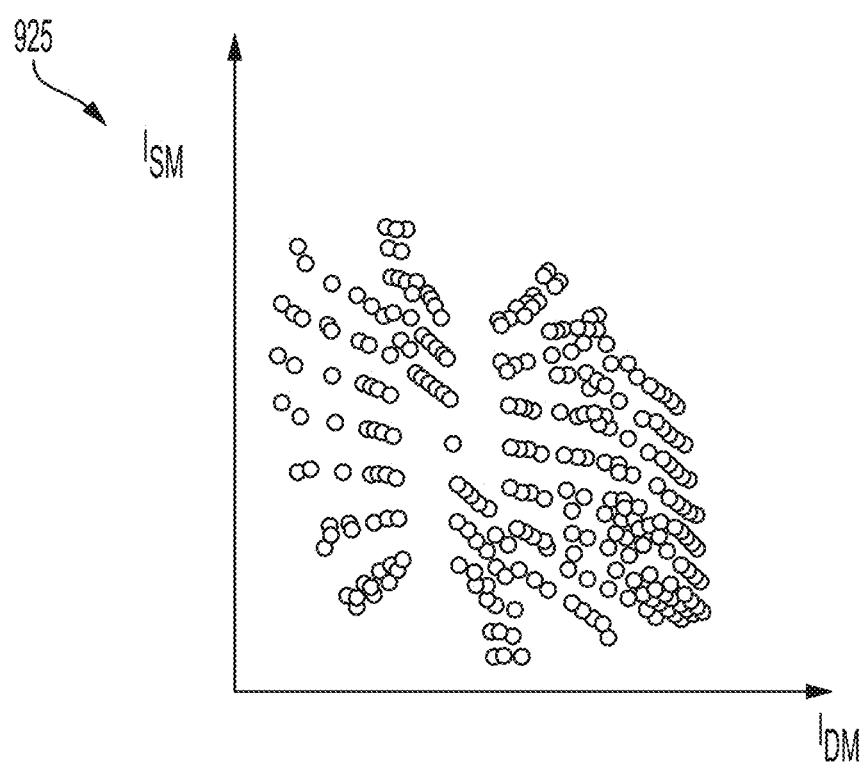

FIGS. 9A and 9B illustrate example distributions of values in the RDQN reference frame and SM/DM reference frame, respectively, which highlight the decoupling of the intended output response in the rotor and stator D-axis provided by the SM/DM reference frame (and is similarly present in the MK reference frame). More particularly, FIG. 9A illustrates a graph 900 with a distribution of different samples of $I_R$ (rotor field current) and $I_D$ (stator D-axis current) pairs from monitoring an example WFS motor. As illustrated, $I_R$ and $I_D$ are tightly coupled and concentrated in an area 905, despite the samples being taken in many different motor scenarios. Accordingly, a motor controller may not be able to distinguish some motor states from other motor states, since they result in similar $I_R$ and $I_D$ values, even though the actual motor states are different.

In contrast, FIG. 9B illustrates a graph 925 with a distribution of the same samples, but expressed in the SM/DM reference space as Ism and $I_{DM}$ pairs. As illustrated, Ism and $I_{DM}$ are more widely distributed such that intended output response in the rotor and stator D-axis are decoupled and a motor controller or other system can more readily distinguish the different motor states from one another. This, in turn, allows for more accurate calculations (e.g., more numerical precision, and better interpolation capability). In certain embodiments, for instance, when used in the context of a lookup table or MIMO controller (e.g., to implement the process 500 of FIG. 5 or the process 700 of FIG. 7), this not only provides greater accuracy, but less data to be held in memory (e.g., the size of data making up the lookup table for sufficient computation) and/or faster operation times. Further, in the MK and SM/DM reference spaces with this additional resolution, a controller may have increased control margin because unaccounted behavior between the controller and the WFS motor is eliminated.

Figure 9C:
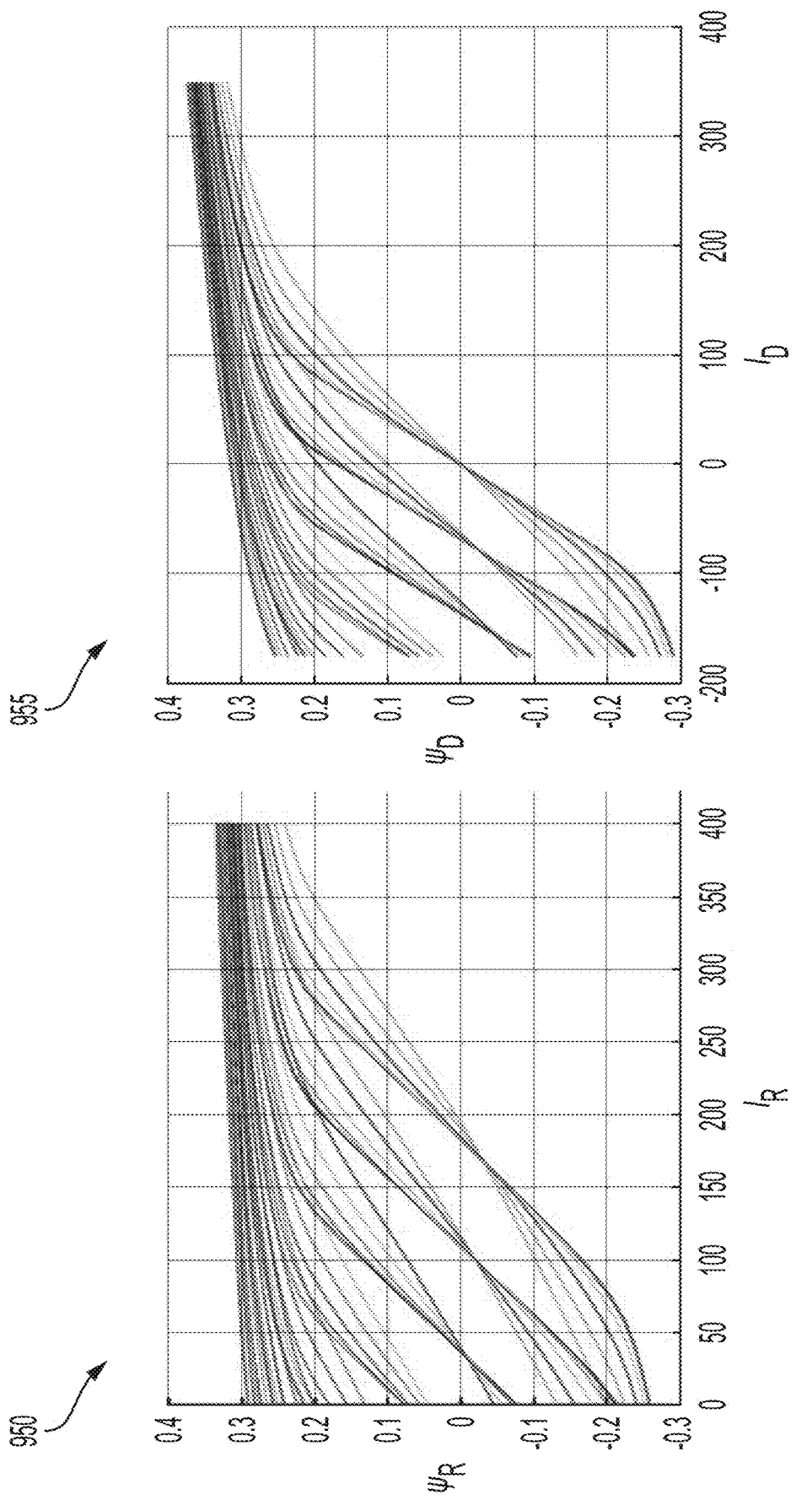
FIGS. 9C-D illustrate graphs of current versus flux for different reference frames.
Figure 9D:
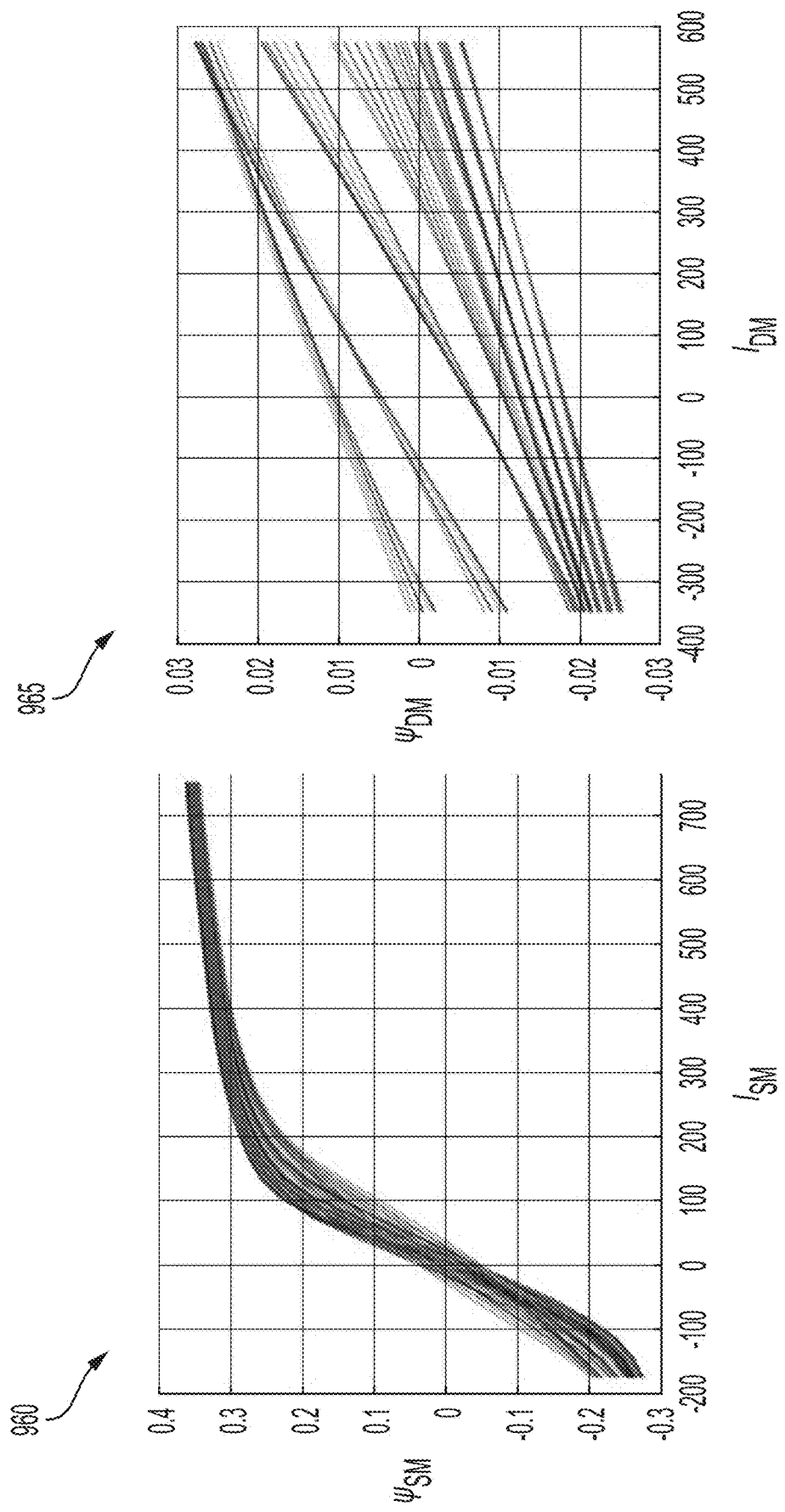

FIGS. 9C and 9D illustrate another example of distributions of values in the RDQN reference frame and SM/DM reference frame, respectively, which highlight the decoupling of the intended output response in the rotor and stator D-axis provided by the SM/DM reference frame (and is similarly present in the MK reference frame). More particularly, FIG. 9C illustrates a graph 950 with a distribution of different samples of rotor field current ($I_R$) and rotor flux ($\psi_R$) pairs, where rotor flux ($\psi_R$) is directly proportional to rotor flux linkage ($\lambda_R$) (i.e., $\lambda_R=\psi_R \times N$ turns of the rotor). Similarly, a graph 955 has a distribution of different samples of stator D-axis current ($I_D$) and stator D-axis flux ($\psi_D$) pairs, where stator D-axis flux ($\psi_D$) is directly proportional to stator D-axis flux linkage ($\lambda_D$) (i.e., $\lambda_D=\psi_D \times N$ turns of the rotor). As illustrated, $I_R$ and $\psi_R$ in graph 950 are tightly coupled with $I_D$ and $\psi_D$ in graph 955. Additionally, because rotor flux ($\psi_R$) is directly proportional to rotor flux linkage ($\lambda_R$) and stator D-axis flux ($\psi_D$) is directly proportional to stator D-axis flux linkage ($\lambda D$), by extension, $I_R$ and $\lambda_R$ are also tightly coupled with $I_D$ and $\lambda_D$. Thus, the lines in graph 950 closely approximate the lines in graph 955. In other words, a change in a dimension of the first graph is nearly directly reflected in a change in a dimension in the other graph. Accordingly, a motor controller may not be able to distinguish some motor states from other motor states, since they result in similar state for $\lambda_R/\lambda_D$, even though the state of $I_R/I_D$ may be different (in some cases, drastically different).

In contrast, FIG. 9D illustrates graphs 960 and 965, which show distributions of the same samples as the graphs 950 and 955, but expressed in the SM/DM reference space as $I_{SM}$ and $\lambda_{SM}$ pairs (in graph 960) and as $I_{DM}$ and $\lambda_{DM}$ pairs (in graph 965). As illustrated, the plots lines in the graph 960 have a different shape than the plot lines in the graph 965 (curved plot lines versus linear or piecewise linear plot lines). Additionally, the plots lines in the graph 960 have a different response pattern than the plot lines in the graph 965 (concentrated plot lines in the graph 960 versus spaced out plots lines in the graph 965). Accordingly, these graphs show the wider distributed of flux linkage values such that intended output response of the rotor and stator D-axis are decoupled, and a motor controller or other system can more readily distinguish the different motor states from one another.

Figure 9E:
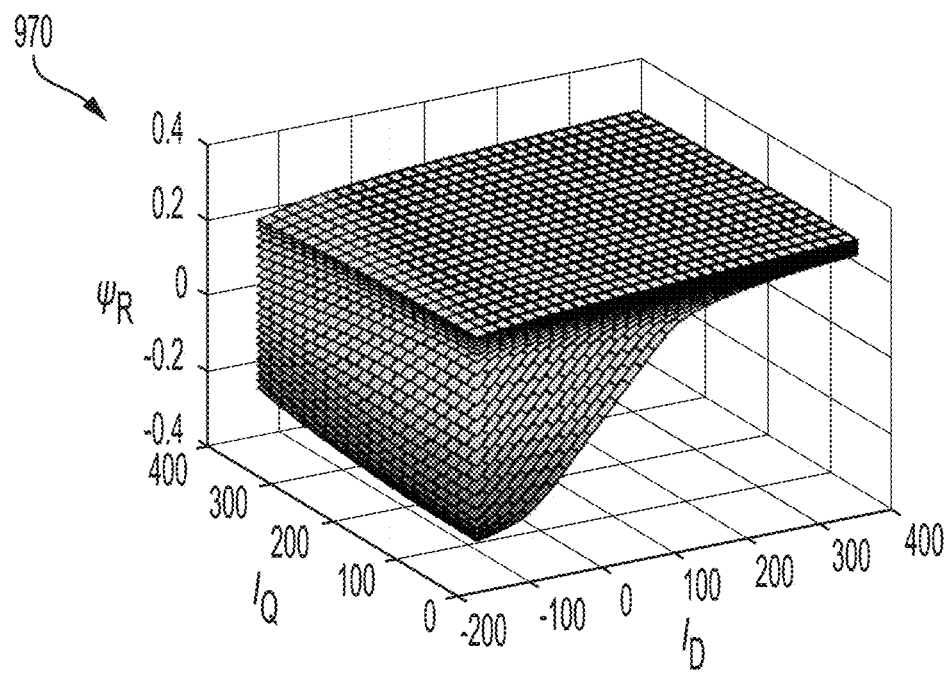
FIGS. 9E-F illustrate three-dimensional graphs of current versus flux for different reference frames.
Figure 9F:
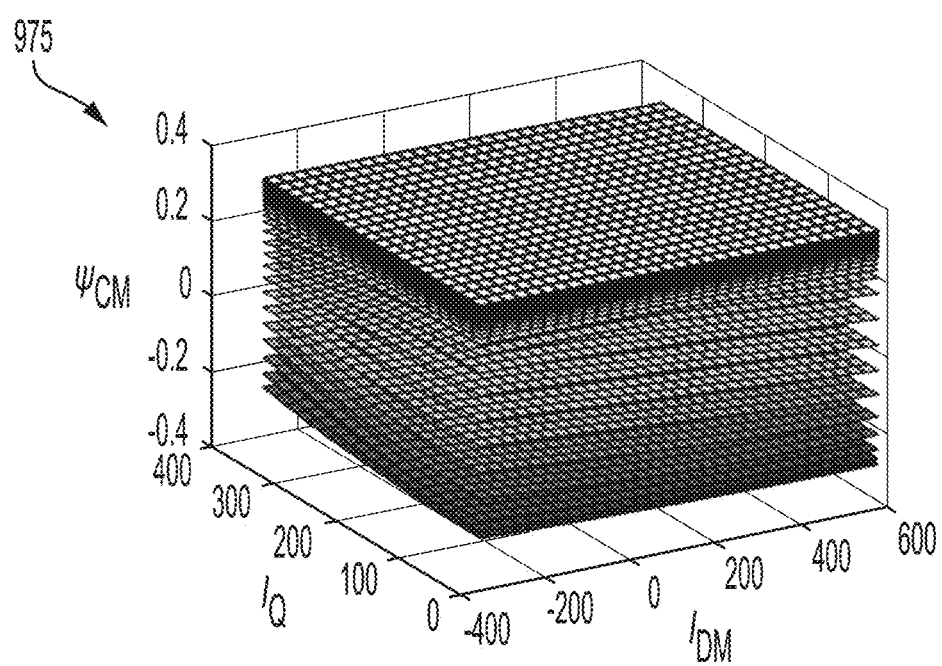

FIGS. 9E and 9F similarly illustrate another example of distributions of values in the RDQN reference frame and SM/DM reference frame, respectively. Here, FIG. 9F illustrates a plot of values in the RDQN reference frame, with stator D-axis current ($I_D$) on the x-axis, Q-axis current ($I_Q$) on the y-axis, and rotor flux ($\psi_R$) on the z-axis. FIG. 9E illustrates a plot of values in the SM/DM reference frame, with difference mode current ($I_{DM}$) on the x-axis, Q-axis current ($I_Q$) on the y-axis, and summation mode flux ($\psi_{SM}$) on the z-axis. Like in FIGS. 9A-D, the distribution of values is wider in the SM/DM reference frame of FIG. 9F, illustrating the decoupling of the intended output response of the rotor and stator D-axis, as compared to the distribution of values in the RDQN reference frame of FIG. 9E.

As described above, the MK reference frame and the SM/DM reference frame may be used for motor control. Additionally, the reference frames, particularly the SM/DM reference frame, may be used for motor design and system modeling. For example, the SM/DM reference frame may be used design a WFS motor (e.g., the WFS motor 115) to be a more diagonalized system, or otherwise to design or shape the motor to maximize or improve an objective function based on the implications of these metrics illustrated or indicated in the SM/DM reference frame.

As noted above, the MK and SM/DM transforms may also be used for motors having a different number of stator and rotor phases than the three-phase stator and single phase rotor provided herein. For a motor with more than three stator phases and/or more than one rotor phase, the motor may be defined as a system with n subsystems, each subsystem being an independent rotating reference frame, such as $RDQ\emptyset_n$ reference frame. For each subsystem, with an approximation that the R and stator D axes are orthogonal to the Q and null axes, $$\begin{bmatrix} \lambda_R^n \\ \lambda_D^n \\ \lambda_Q^n \\ \lambda_\phi^n \end{bmatrix} = \begin{bmatrix} L_{R,D}^n & L_{R,D}^n & 0 & 0 \\ L_{R,D}^n & L_{R,D}^n & 0 & 0 \\ 0 & 0 & L_Q^n & 0 \\ 0 & 0 & 0 & L_\phi^n \end{bmatrix} \begin{bmatrix} i_R^n \\ i_D^n \\ i_Q^n \\ i_\phi^n \end{bmatrix}$$

Further, the SM/DM transformation matrix for subsystem n of N may be $$[T^{RDQ\emptyset_n \to SDMQ\emptyset_n}]_n = \frac{1}{\alpha}\begin{bmatrix} 1 & 1 & 0 & 0 \\ 1 & -1 & 0 & 0 \\ 0 & 0 & 1 & 0 \\ 0 & 0 & 0 & 1 \end{bmatrix}$$

where $\alpha$ may either be 1 (impedance-invariant) or $1/\sqrt{2}$ (norm-invariant).

These sub-matrices may be chained together with the $ABC_n$-to-$DQ\emptyset_N$ matrices that have a row and column added for each rotor phase. For example, provided below are transforms for transforming from the stationary reference frame to a $RDQ\emptyset$ reference frame for a motor having a six phase stator and two phase rotor. The stationary reference frame represents the six stator phases as $A_0$, $B_0$, $C_0$, $A_1$, $B_1$, and $C_1$, and the two rotor phases as $R_0$ and $R_1$. The $RDQ\emptyset$ reference frame represents the motor as essentially two independent rotating machines or motors, also referred to as two subsystems, having component sets $D_0$, $Q_0$, $N_0$, $R_0$ (first machine) and $D_1$, $Q_1$, $N_1$, and $R_1$ (second machine).

$$\begin{bmatrix} i_{R0} \\ i_{D0} \\ i_{Q0} \\ i_{\phi 0} \\ i_{R1} \\ i_{D1} \\ i_{Q1} \\ i_{\phi 1} \end{bmatrix} = \frac{1}{\sqrt{3}} \times$$

-continued $$\begin{bmatrix} 1 & 0 & 0 & 0 & 0 & 0 & 0 & 0 \\ 0 & \cos(\theta_R^e - 0°) & \cos(\theta_R^e - 120°) & \cos(\theta_R^e - 240°) & 0 & \cos(\theta_R^e - 90) & \cos(\theta_R^e - 210°) & \cos(\theta_R^e - 330°) \\ 0 & -\sin(\theta_R^e - 0°) & -\sin(\theta_R^e - 120°) & -\sin(\theta_R^e - 240°) & 0 & -\sin(\theta_R^e - 90°) & -\sin(\theta_R^e - 210°) & -\sin(\theta_R^e - 330°) \\ 0 & \frac{1}{\sqrt{2}} & \frac{1}{\sqrt{2}} & \frac{1}{\sqrt{2}} & 0 & \frac{1}{\sqrt{2}} & \frac{1}{\sqrt{2}} & \frac{1}{\sqrt{2}} \\ 0 & 0 & 0 & 0 & 1 & 0 & 0 & 0 \\ 0 & \cos(\theta_R^e - 90°) & \cos(\theta_R^e - 210°) & \cos(\theta_R^e - 330°) & 0 & \cos(\theta_R^e - 0°) & \cos(\theta_R^e - 120°) & \cos(\theta_R^e - 240°) \\ 0 & -\sin(\theta_R^e - 90°) & -\sin(\theta_R^e - 210°) & -\sin(\theta_R^e - 330°) & 0 & -\sin(\theta_R^e - 0°) & -\sin(\theta_R^e - 120°) & -\sin(\theta_R^e - 240°) \\ 0 & \frac{1}{\sqrt{2}} & \frac{1}{\sqrt{2}} & \frac{1}{\sqrt{2}} & 0 & -\frac{1}{\sqrt{2}} & -\frac{1}{\sqrt{2}} & -\frac{1}{\sqrt{2}} \end{bmatrix}$$

$$\times \begin{bmatrix} i_{R0} \\ i_{A0} \\ i_{B0} \\ i_{C0} \\ i_{R1} \\ i_{A1} \\ i_{B1} \\ i_{C1} \end{bmatrix}$$

Each of the RDQØ component sets may then be transformed into the MK reference or the SM/DM reference frame as previously described above. For example, in the 6-phase stator, 2-phase rotor case, the inductance matrix takes the following form:

$$\begin{bmatrix} \lambda_R^0 \\ \lambda_D^0 \\ \lambda_Q^0 \\ \lambda_\phi^0 \\ \lambda_R^1 \\ \lambda_D^1 \\ \lambda_Q^1 \\ \lambda_\phi^1 \end{bmatrix} = \begin{bmatrix} L_{R,D}^0 & L_{R,D}^0 & 0 & 0 & 0 & 0 & 0 & 0 \\ L_{R,D}^0 & L_{R,D}^0 & 0 & 0 & 0 & 0 & 0 & 0 \\ 0 & 0 & L_Q^0 & 0 & 0 & 0 & 0 & 0 \\ 0 & 0 & 0 & L_\phi^0 & 0 & 0 & 0 & 0 \\ 0 & 0 & 0 & 0 & L_{R,D}^1 & L_{R,D}^1 & 0 & 0 \\ 0 & 0 & 0 & 0 & L_{R,D}^1 & L_{R,D}^1 & 0 & 0 \\ 0 & 0 & 0 & 0 & 0 & 0 & L_Q^1 & 0 \\ 0 & 0 & 0 & 0 & 0 & 0 & 0 & L_\phi^1 \end{bmatrix} \begin{bmatrix} i_R^0 \\ i_D^0 \\ i_Q^0 \\ i_\phi^0 \\ i_R^1 \\ i_D^1 \\ i_Q^1 \\ i_\phi^1 \end{bmatrix}$$

Then, the SM/DM transform matrix for the two RDQØ subsystem is:

$$[T^{RDQ\phi \to SMDMQ\phi}] = \frac{1}{\alpha}\begin{bmatrix} i_{SM}^0 \\ i_{DM}^0 \\ i_Q^0 \\ i_\phi^0 \\ i_{SM}^1 \\ i_{DM}^1 \\ i_Q^1 \\ i_\phi^1 \end{bmatrix} = \frac{1}{\alpha}\begin{bmatrix} 1 & 1 & 0 & 0 & 0 & 0 & 0 & 0 \\ 1 & -1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 1 & 0 & 0 \\ 0 & 0 & 0 & 0 & 1 & -1 & 0 & 0 \\ 0 & 0 & 0 & 0 & 0 & 0 & 1 & 0 \\ 0 & 0 & 0 & 0 & 0 & 0 & 0 & 1 \end{bmatrix}\begin{bmatrix} i_R^0 \\ i_D^0 \\ i_Q^0 \\ i_\phi^0 \\ i_R^1 \\ i_D^1 \\ i_Q^1 \\ i_\phi^1 \end{bmatrix}$$

where $\alpha$ is either be 1 (impedance-invariant, SM/DM) or $1/\sqrt{2}$ (norm-invariant, MK).

The transform from RABC-to-SMDMQØ may then be the matrix product of these two transforms, $$[i^{SMDQ\phi}] = [T^{RDQ\phi \to SMDMQ\phi}][T^{RABC \to RDQ\phi}][i^{RABC}]$$

As a result of the transformations, the motor may be represented, for example, as two SM/DM reference frame subsystems (e.g., $SM_0$, $DM_0$, $Q_0$, $\emptyset_0$ and $SM_1$, $DM_1$, $Q_1$, $\emptyset_1$) in some examples, and as two MK reference frame subsystems (e.g., $M_0$, $K_0$, $Q_0$, $\emptyset_0$ and $M_1$, $K_1$, $Q_1$, $\emptyset_1$) in some examples.

Figure 10:
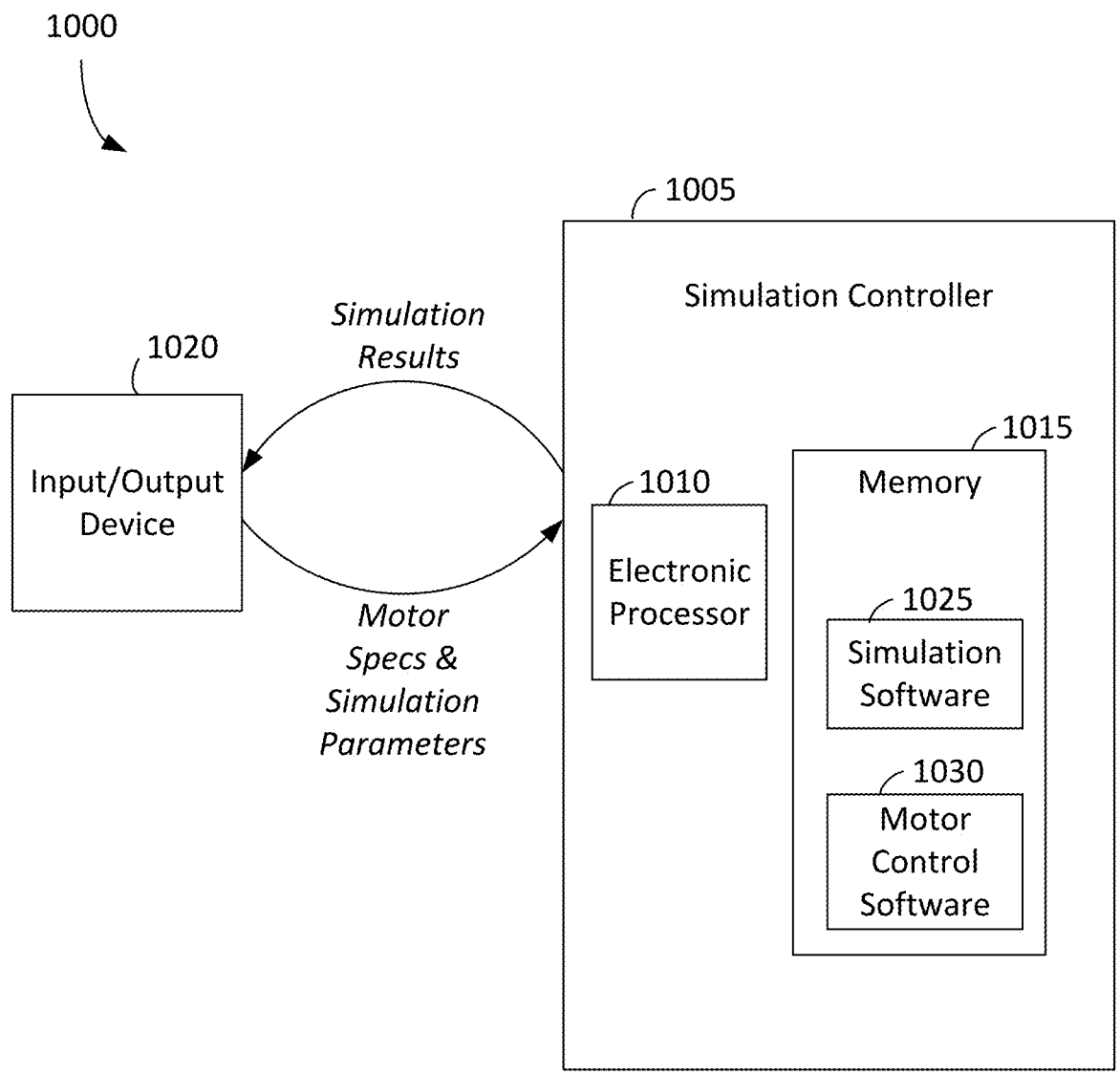
FIG. 10 illustrates a motor design system according to some embodiments.

FIG. 10 illustrates a motor design system 1000 for designing and/or modeling WFS motors, such as the WFS motor 115, using a rotating reference frame that decouples an intended output response in a stator D-axis component and a rotor component of the DQNR reference frame. The system 1000 includes a simulation controller 1005 having an electronic processor 1010 and memory 1015. The simulation controller 1005 is in communication with an input/output device 1020 to receive motor specifications and simulation parameters, and to send simulation results, as described in further detail below with respect to the process 1100 of FIG. 11.

The memory 1015 includes one or more of a read only memory (ROM), random access memory (RAM), or other non-transitory computer-readable media that stores simulation software 1025 and motor control software 1030. The electronic processor 1010 is configured to, among other things, receive instructions and data from the memory 1015 and execute the instructions to, for example, carry out the functionality of the simulation controller 1005 described herein, including the process 1100 of FIG. 11. For example, the electronic processor 1010 is configured to execute the simulation software 1025 for designing and modeling WFS motors.

Although the simulation controller 1005, the electronic processor 1010, and the memory 1015 are each illustrated as a respective, single unit, in some embodiments, one or more of these components is a distributed component. For example, in some embodiments, the electronic processor 1010 includes one or more microprocessors and/or hardware circuit elements. Additionally, the distributed components may be located remotely from one another and, for example, connected by a network (e.g., a local network, a wide area network (e.g., the Internet), or another network) to enable communication between components.

The input/output device 1020 may include one or more of displays, touchscreens, touchscreen displays, keyboards, mice, pushbuttons, dials, pedals, microphones, speakers, and the like to receive input from a user and to provide output to a user. In some embodiments, the input/output device 1020 is configured to receive motor specifications and simulation parameters, and to provide these specifications and parameters to the simulation controller 1005. The simulation controller 1005 is configured to use these specifications and parameters, for designing and modeling a WFS motor. The simulation controller 1005 is configured to output simulation results based on the motor specifications and simulation parameters. The input/output device 1020 may be local to the other components of the motor design system 1000 or may be remote and connected via one or more intermediary communication networks or interfaces. In some embodiments, the input/output device 1020 is incorporated into a client computing device (e.g., a desktop or laptop) that is in communication with the simulation controller 1005.

Figure 11:
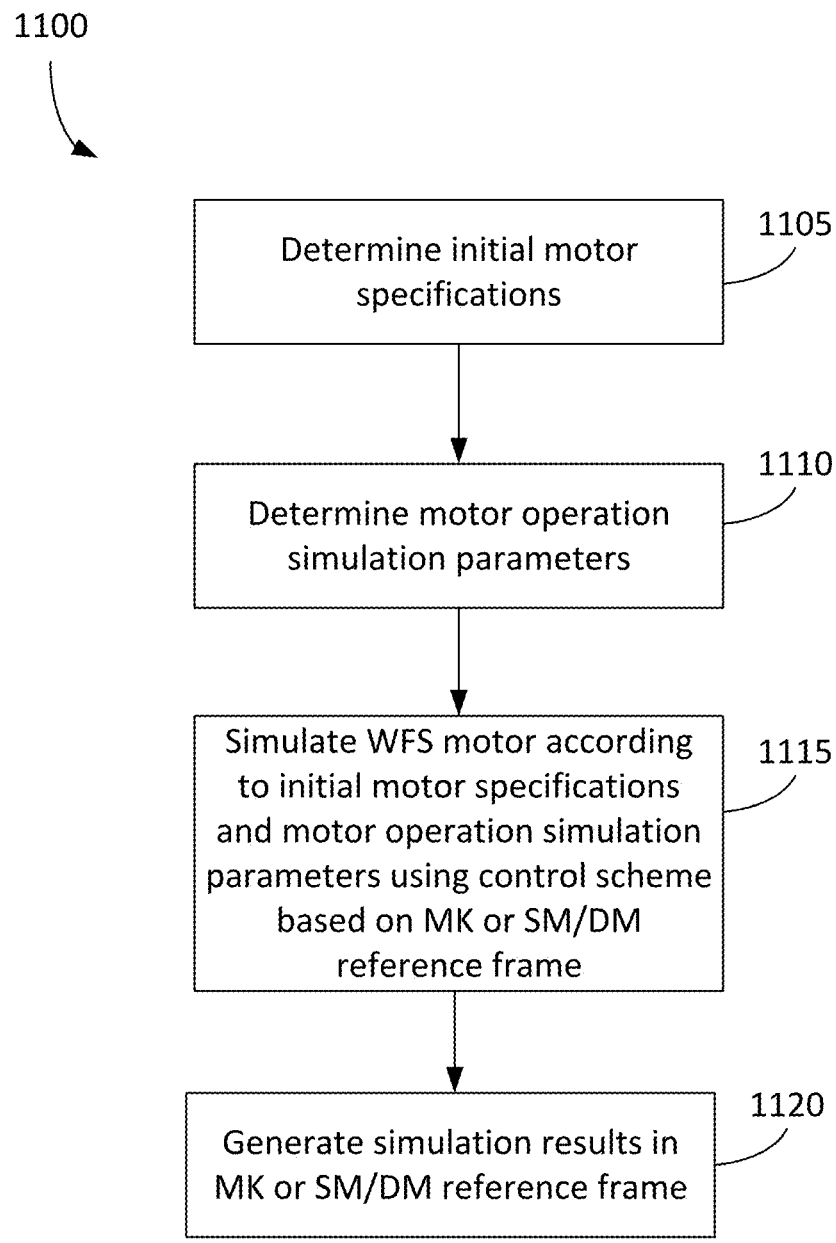
FIG. 11 illustrates a process for generating simulation results for designing and/or modeling WFS motors according to some embodiments.

FIG. 11 illustrates a process 1100 for generating simulation results for designing and/or modeling WFS motors, such as the WFS motor 115, using a rotating reference frame that decouples an intended output response in a stator D-axis component and a rotor field component of the DQNR reference frame. The process 1100 is described as being carried out by the motor design system 1000. However, in some embodiments, the process 1100 may be implemented by another motor design system. Additionally, although the blocks of the process 1100 are illustrated in a particular order, in some embodiments, one or more of the blocks may be executed partially or entirely in parallel, may be executed in a different order than illustrated in FIG. 11, or may be bypassed.

In block 1105, the simulation controller 1005 determines initial motor specifications. The initial motor specifications may indicate one or more of: rotor core dimensions (e.g., inner diameter, outer diameter, and/or length); number, dimensions, and location of rotor teeth; number and location of rotor poles; number, dimensions, location, and field properties of rotor permanent magnets; number, dimensions, location, and conduction properties of rotor windings or conductors; stator core dimensions (e.g., inner diameter, outer diameter, and/or length); number, dimensions, and location of stator teeth; number and location of stator poles; number dimensions stator laminations; number, dimensions, location, and conduction properties of stator windings or conductors; dimensions and properties of a back iron; as well as other motor characteristics. In some embodiments, the initial motor specifications may be received in the form of manual data entry (e.g., input of alphanumeric values, selection of radio buttons, etc. via a graphical user interface) and/or one or more computer aided drawing (CAD) files.

The simulation controller 1005 may, for example, receive the initial motor specifications from the input/output device 1020 and/or from the memory 1015. In some examples, one or more specifications of the initial motor specifications are directly indicated to the simulation controller 1005 (e.g., by the input/output device 1020) or directly obtained from the memory 1015. In some examples, the simulation controller 1005 may derive one or more specifications of the initial motor specifications from other data or from other specifications of the initial motor specifications received or otherwise determined by the simulation controller 1005.

In block 1110, the simulation controller 1005 determines motor operation simulation parameters. In some embodiments, the motor operation simulation parameters include one or more of rotor bus voltage; stator bus voltage; ambient temperature; motor speed; motor torque; stator current magnitude; rotor current magnitude; as well as other parameters. Each such parameter may be a single value or a range of values to be simulated. For example, a motor speed parameter may include a range of speed command values over which the motor is to be simulated. Similarly, a motor torque parameter may include a range of torque command values over which the motor is to be simulated. The simulation controller 1005 may, for example, receive the motor operation simulation parameters from the input/output device 1020 and/or from the memory 1015.

Figure 8:
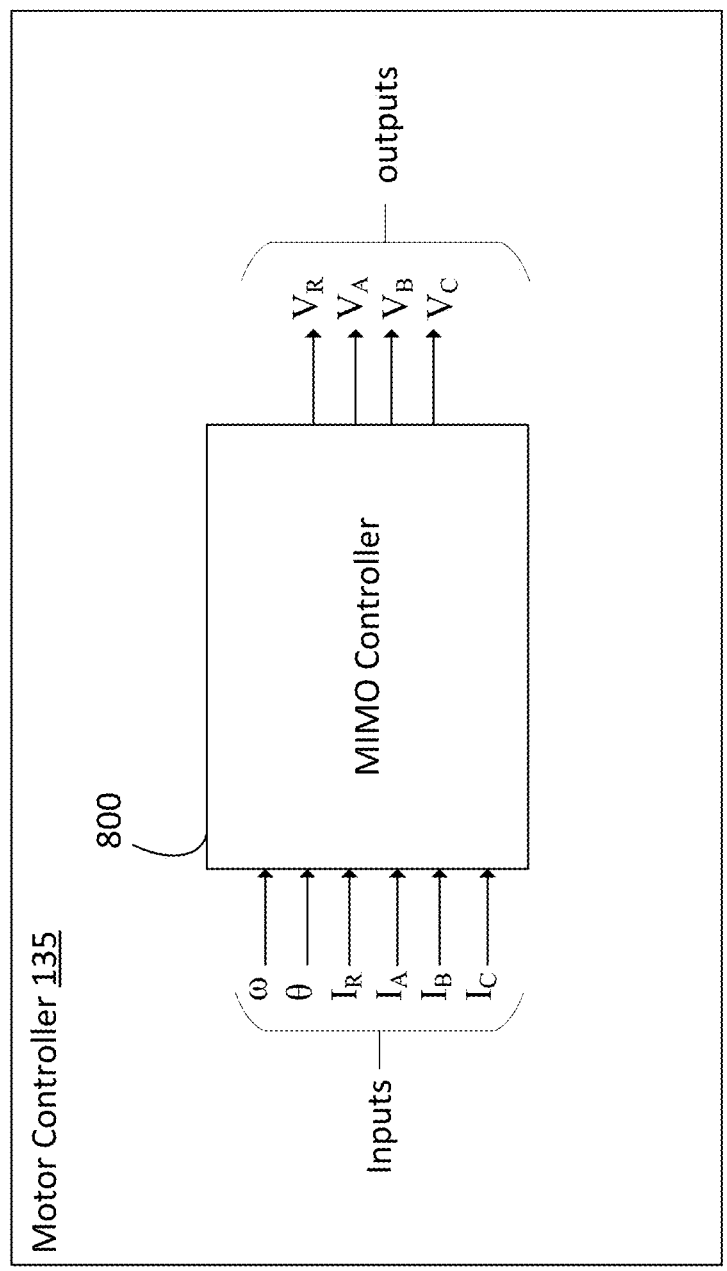
FIG. 8 illustrates a multiple input multiple output (MIMO) controller for controlling a WFS motor according to some embodiments.
Figure 12:
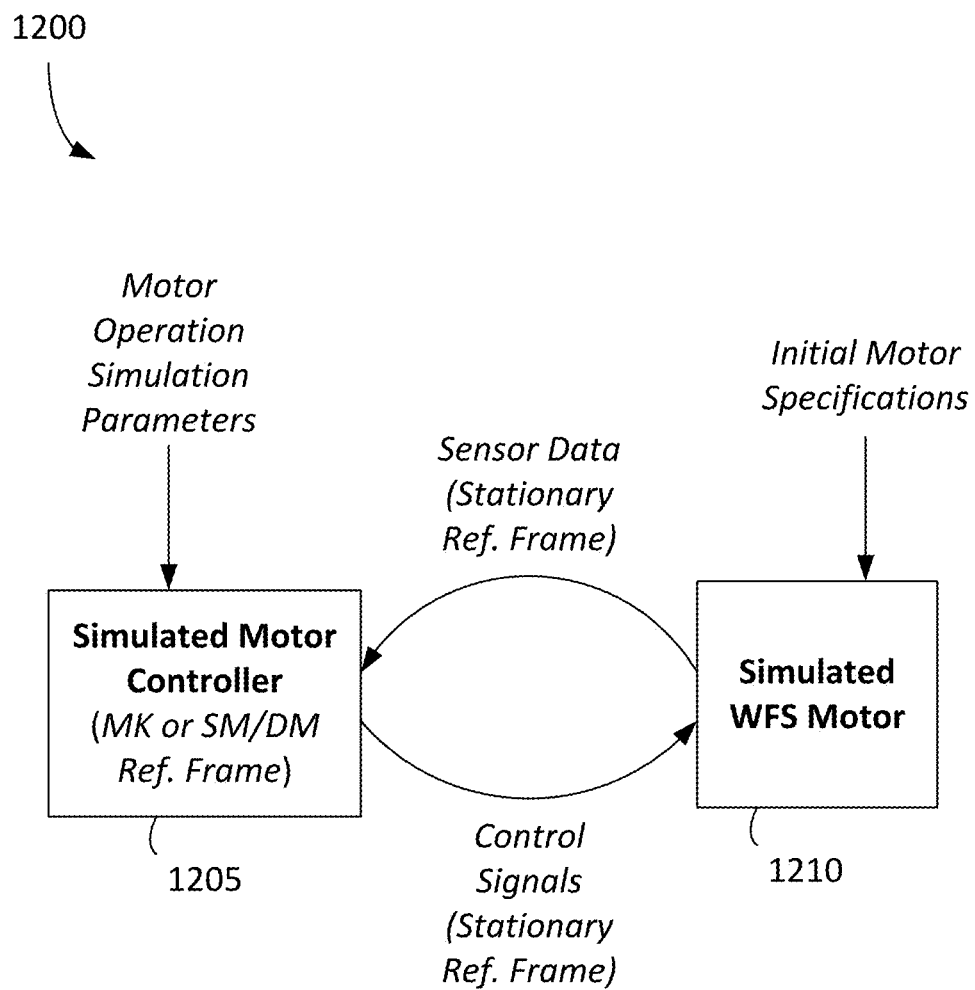
FIG. 12 illustrates a simulation system according to some embodiments.

In block 1115, the simulation controller 1005 simulates a WFS motor according to the initial motor specifications defining the WFS motor and according to the motor operation simulation parameters using a control scheme based on a rotating reference frame with independent input channels that decouple an intended output response in a stator D-axis component and a rotor field component of the DQNR reference frame. To simulate the WFS motor, the simulation controller 1005 may simulate control in accordance with the process 400 of FIG. 4 using the MK reference frame or the SM/DM reference frame. For example, with reference to FIG. 12, a simulation system 1200 is illustrated, which may be generated by the simulation controller 1005 through the execution of the simulation software 1025 and motor control software 1030 to carry out block 1115. More particularly, the simulation controller 1005 may execute the motor control software 1030 to provide a simulation motor controller 1205 and may execute the simulation software 1025 to provide a simulated WFS motor 1210. The simulation motor controller 1205 may execute the process 400 of FIG. 4 to simulate control of the simulated WFS motor 1210. For example, the simulation motor controller 1205 may be an implementation of the regulator 600 of FIG. 6, an implementation of the MIMO controller 800 of FIG. 8, or another of the MK reference frame or SM/DM reference frame controllers described above.

The simulation motor controller 1205 may receive sensor data from the simulated WFS motor 1210 in the stationary reference frame, and may provide control signals to the simulated WFS motor 1210 in the stationary reference frame. The simulated WFS motor 1210 may receive the initial motor specifications defining the motor, and may receive simulated control signals in the stationary reference frame from the simulated motor controller 1205. The simulated WFS motor 1210 may then simulate control of the WFS motor based on those signals and the initial motor specifications, and, in response, generate updated simulated sensor signals in the stationary reference frame for providing to the simulated motor controller 1205. As noted above, the simulated WFS motor 1210 may be implemented by the execution of the simulation software 1025. The simulation software 1025 may be known motor simulation software, such as Ansys Maxwell, Altair Flux, FEMM, Jmag, Gmsh, or another electromagnetic element solver.

When implementing control based on the MK reference frame, such as described with respect to the process 500 of FIG. 5, the simulation motor controller 1205 may translate a speed or torque command received as part of the motor operation simulation parameters into set point values for the M, K, and Q-axes (e.g., using a lookup table that maps speed or torque commands to set point values). Additionally, the simulation motor controller 1205 may transform received simulated sensor data for a simulated WFS motor from the stationary reference frame to the MK reference frame, generate simulated control signals in the MK reference frame, and transform the simulated control signals to the stationary reference frame for controlling the simulated WFS motor, such as described with respect to the regulator 600 of FIG. 6. In other examples, the simulation controller 1005 may simulate control using MK reference frame-based control techniques described above other than the regulator 600 of FIG. 6 (e.g., using one or more lookup tables).

When implementing control based on the SM/DM reference frame, such as described with respect to the process 700 of FIG. 7, the simulation motor controller 1205 may translate a speed or torque command received as part of the motor operation simulation parameters into set point values for the SM, DM, and Q-axes (e.g., using a lookup table that maps speed or torque commands to set point values). Additionally, the simulation motor controller 1205 may transform received simulated sensor data for a simulated WFS motor from the stationary reference frame to the SM/DM reference frame, generate simulated control signals in the SM/DM reference frame, and transform the simulated control signals to the stationary reference frame for controlling the simulated WFS motor, such as described with respect to the MIMO controller 800 of FIG. 8. In other examples, the simulation controller 1005 may simulate control using SM/DM reference frame-based control techniques described above other than the MIMO controller 800 of FIG. 8 (e.g., using a regulator similar to regulator 600 of FIG. 6 modified for the SM/DM reference frame).

In block 1120, the simulation controller 1005 generates simulation results in a rotating reference frame that has independent input channels that decouple an intended output response in a stator D-axis component and a rotor field component of the DQNR reference frame, such as the MK or SM/DM reference frame. For example, the simulation results may include a result data set having time series data including one or more of the motor simulation operation parameters, simulated control signals in the MK or SM/DM reference frame, simulated sensor signals in the MK or SM/DM reference frame, simulated control signals in the stationary reference frame, simulated sensor signals in the stationary reference frame. This result data set may be recorded during the simulation of the simulated WFS motor 1210 based on control by the simulated motor controller 1205, and output as a table or other data collection format. Additionally or alternatively, the simulation results may provide a subset of this time series data, or information derived from this time series data. The result data set may be stored in the memory 1015 and/or output to the input/output device 1020 (e.g., for display on an electronic display, transmission to a further device, or storage).

By simulating a WFS motor as described with respect to the process 1100 of FIG. 11, using a rotating reference frame that has independent input channels that decouple an intended output response in a stator D-axis component and a rotor field component of the DQNR reference frame (e.g., the MK or SM/DM reference frame), more efficient simulation may be performed, new insights may be provided, and/or simulation may be simplified.

As a first example of improved efficiency, because a more dispersed flux linkage map can be generated in the MK or SM/DM reference frame (see, e.g., FIGS. 9A-9F), the WFS motor 1210 can be simulated with fewer operational parameters to obtain a result data set that is informative for a particular motor design. For example, to get a similar level of information using the RDQ reference frame, if even possible, the WFS motor 1210 would need to be simulated with additional operational parameters (e.g., at a finer granularity) to generate inferior information. Thus, the simulation itself may use less resources, such as processing time and processing power. As a second example of improved efficiency, because the WFS motor 1210 can be simulated with fewer operational parameters, a smaller result data set may be generated, which may occupy less memory storage space.

Figure 13:
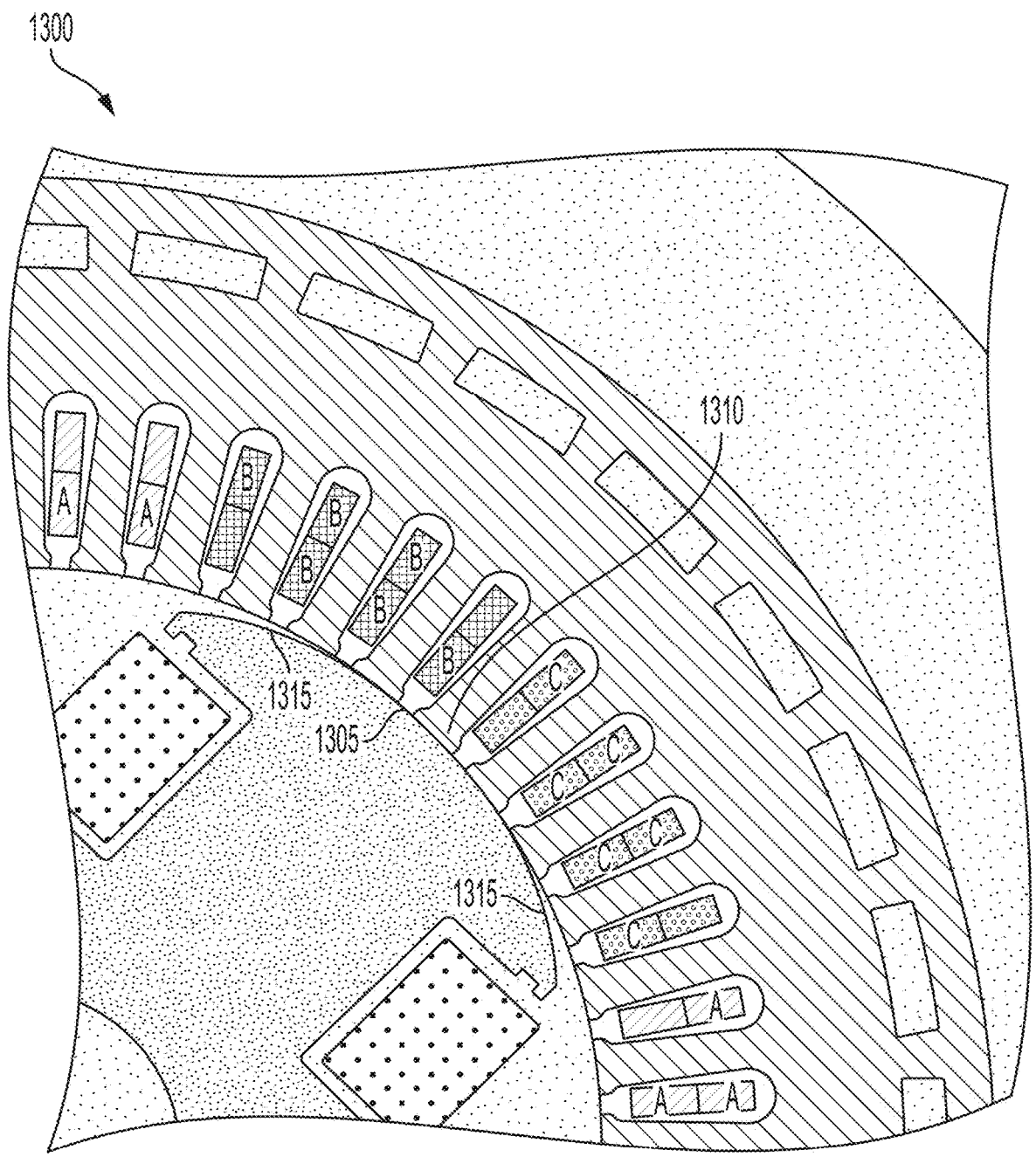
FIG. 13 illustrates an air gap of a portion of a WFS motor according to some embodiments.

Further, new insights on a motor design may be provided using the process 1100, which enables design changes to improve or optimize certain motor characteristics that were previously challenging to analyze and adjust. For example, the SM/DM reference frame may be used to design a pole face shape to reduce a leakage component (e.g., a DM-axis or K-axis component) for a given design. In some examples, the SM/DM reference frame may demonstrate a pole face shape to reduce a leakage component by managing the proximity of a rotor pole face to an air gap for active poles of the WFS motor. For example, with reference to FIG. 13, to reduce leakage in a WFS motor 1300 (which may be an example of the WFS motor 115 or simulated WFS motor 1210), having three stator phases (A, B, and C), the air gap between a rotor pole face 1305 where it overlaps with phase A stator poles (a center of the phase A stator poles is identified as pole 1310) may be minimized or reduced, while the rotor pole face 1305 may be stepped back or flared away from the stator (increasing the air gap) at the ends 1315 of the rotor pole face 1305 wherein the rotor pole face 1305 aligns with poles of the phases B and C. By viewing a result data set generated by the process 1100 and, in particular, the simulated sensor signals in the MK or SM/DM reference frame, the leakage components of the design may be readily indicated. The simulation controller 1005 may execute the process 1100 iteratively for various pole shapes to identify a particular pole shape that achieves a desired leakage component for the motor. For example, with each iteration, the initial motor specifications may be replaced with revised motor specifications for the simulation controller 1005 to simulate and analyze further motor designs (e.g., designs with revised pole shapes). The simulation controller 1005 may compare the generated simulation results for each design and identify the design that provides the best or a suitable leakage component (e.g., a highest M-axis inductance or a lowest K-axis inductance). The simulation controller 1005 may generate an output, as part of block 1120, indicating (e.g., via the input/output device 1020) the design providing the best or suitable leakage component.

In another example, the SM/DM reference frame may be used to design a winding pattern to reduce a leakage component (e.g., a DM-axis or K-axis component) for a given design. In some examples, the SM/DM reference frame may demonstrate a winding pattern to reduce a leakage component by, for instance, overlapping windings on the stator. For instance, a winding pattern may be modeled using the SM/DM reference frame and determined to be more advantageous because the WFS motor is more diagonal than with another modeled winding pattern. For example, winding patterns using shared slots, or a double layer winding, to shift the system flux may be modeled in the SM/DM reference frame. By viewing a result data set generated by the process 1100 and, in particular, the simulated sensor signals in the MK or SM/DM reference frame, the leakage components resulting from a particular winding design may be readily indicated.

In some examples, the process 1100 may be executed iteratively for various winding designs to identify a particular winding design that achieves a desired leakage component for the motor. For example, with each iteration, the simulation controller 1005 may simulate the WFS motor with an updated motor specification and/or motor operation simulation parameter. In some examples, the simulation controller 1005 may compare the generated simulation results for each winding design and identify the design that provides the best or a suitable leakage component (e.g., a highest M-axis inductance or a lowest K-axis inductance). The simulation controller 1005 may generate an output, as part of block 1120, indicating (e.g., via the input/output device 1020) the winding design providing the best or suitable leakage component.

Depending on the particular WFS motor and potential application, different design criteria may be applicable. For example, it may be beneficial to design a motor having low leakage flux linkage (DM), for example, for efficient wireless power transfer from the stator to rotor applications or for a faster electromagnetic response. Generally, a motor controller's resolution should increase as the leakage flux linkage (DM) decreases. Accordingly, the SM/DM reference frame can assist in balancing these characteristics to achieve a motor design sufficient for a particular application.

In some embodiments, the simulation controller implements an automated design process in which the process 1100 is repeated to identify a desired motor parameter. For example, with each iteration of the process 1100, the simulation controller 1005 may determine one or more modified motor parameters that include a modified value for the one or more initial motor specifications and/or motor operation simulation parameters used for a previous motor simulation. For each iteration, the simulation controller 1005 may then simulate the WFS motor using the modified motor parameter (e.g., along with the motor specifications and/or motor operation simulation parameters of the previous simulation that were not modified). From the simulation, the simulation controller 1005 may generate further simulation results in or based on the rotating reference frame (e.g., MK or SM/DM reference frame), as described above. The simulation controller 1005 may then analyze the further simulation results from one or more of the simulation iterations to identify a motor parameter (e.g., a motor specification and/or motor operation simulation parameter from one of the simulation iterations) that provides a desired effect for the motor (e.g., that maximizes, minimizes, or improves a motor characteristic). The desired effect can be one of the aforementioned effects, such as maximized or minimized leakage current. The simulation controller 1005 may then output an indication of the motor parameter (e.g., explicitly or via identifying a design iteration having the motor parameter) that provides the desired effect. The indication may be provided to the input/output unit 160 (e.g., for display, storage, or transmission).

In some embodiments, the simulation controller implements an automated design process in which the process 1100 is repeated for a range of different motor specifications and/or motor operation simulation parameters, and generated simulation results are analyzed to identify designs (and associated motor parameters) to provide particular characteristics (e.g., characteristics that maximize, minimize, or improve certain features of the motor). For example, after an initial execution of the process 1100, one or more of the motor specifications (of block 1105) and/or the motor operation simulation parameters (of block 1110) may be perturbed (e.g., incremented or decremented). The WFS motor 1210 may be re-simulated with the updated specifications and/or parameters (block 1115). The simulation controller 1005 may then analyze the simulation results (as part of block 1120) from run to run to direct the design process toward revising a specific variable, or set of variables, towards a desired goal (e.g., maximizing or increasing M-axis inductance and/or minimizing or reducing K-axis inductance). For example, if a change in a specification or parameter improves the variable such that the output moves in the right direction towards the desired goal (e.g., increases M-axis inductance), then the controller may further that change in the specification or parameter (e.g., increase it further or decrease it further, as the case may be) and re-run the simulation. If the change negatively impacts the variable (e.g., decreases M-axis inductance), then the controller may change the specification or parameter in the opposite direction and re-run the simulation.

This process may be performed iteratively to identify values for particular motor specifications or operational parameters that improve specific variables or sets of variables. For example, the simulation controller 1005 may compare the specific variables or sets of variables from the sets of simulation results, and identify the variable(s) that are nearest or best satisfy the desired goal. For example, the simulation controller 1005 may include comparing variables from different simulations direction and/or comparing variables to predetermined thresholds (e.g., associated with minimum or desired performance levels) as part of this analysis. The simulation controller 1005 may then identify and indicate (e.g., to the input/output device 1020) the particular specifications and/or operational parameters associated with the identified variable(s).

Additionally, the simulation controller 1005 may receive boundary conditions (e.g., a range) and step sizes for motor specifications or operation parameters for performing a plurality of motor design simulations. The simulation controller 1005 may simulate each motor design for each step of the range of motor specifications and operation parameters, and analyze the generated simulation results for each simulation relative to one another. The simulation controller 1005 may compare the specific variables or sets of variables from the sets of simulation results, and identify the variable(s) that are nearest or best satisfy the desired goal. For example, the simulation controller 1005 may include comparing variables from different simulations direction and/or comparing variables to predetermined thresholds (e.g., associated with minimum or desired performance levels) as part of this analysis. The simulation controller 1005 may then identify and indicate (e.g., to the input/output device 1020) the particular specifications and/or operational parameters associated with the identified variable(s).

In some embodiments, when multiple simulations of a motor occur (e.g., with different specifications and/or simulation parameters), the simulation controller 1005 may execute the simulations in parallel, partially in parallel, or serially.

Further, modeling a WFS motor may be simplified by using the process 1100. For example, the SM/DM reference frame may be used to select a number of phases (e.g., selecting between three or six phases) on a WFS motor. By adding phases, additional axes of control are introduced for additional precision to manage the magnetizing or leakage components. However, the SM/DM reference frame can simplify the modeling of these additional control axes by transforming the control axes (e.g., one for each phase) into the SM-axis, DM-axis, and Q-axis components of the SM/DM reference frame.

In another example, the SM/DM reference frame may be used to select a type of winding (e.g., solid conductive bar or concentrated winding) and type of individual slot or tooth control where discrete control of each slot or tooth is an available design option. Again, with each additional controllable winding, an additional axis of control is introduced, which provides for additional precision to manage the magnetizing or leakage components, but complicates motor control and modeling. However, the SM/DM reference frame can simplify the modeling of these additional control axes by transforming the control axes (e.g., one for each phase) into the SM-axis, DM-axis, and Q-axis components of the SM/DM reference frame.

In some embodiments of the process 1100, the rotating reference frame that has independent input channels that decouple an intended output response in the D-axis and rotor field (R) components is used in block 1115, but not 1120, or is used in block 1120, but not in 1115. For example, in some embodiments, in block 1115, the motor is controlled using standard control techniques (e.g., in the RDQN reference frame) without using the MK or SM/DM reference frame-based control schemes. Then, in block 1120, the result data set is generated in or translated to the MK or SM/DM reference frame, which can still provide valuable insight even though the motor was not simulated using the MK or SM/DM reference frames. Further, in some embodiments, in block 1115, the motor is controlled as described above using the MK or SM/DM reference frame-based control schemes. However, in block 1120, the result data set is generated in or translated to a reference frame other than the MK or SM/DM reference frame, such as the stationary reference frame or the RDQN reference frame.

Additionally, although the process 1100 of FIG. 11 is described with respect to a simulated WFS motor, in some embodiments, a physical WFS motor, such as the WFS motor 115, may be controlled in accordance with the process 1100 to generate a result data set. For example, the motor controller 135 may record or output a result data set having time series data including one or more of the motor commands (e.g., from the input/output device 160), control signals in the stationary reference frame (e.g., to the motor drive circuit 150), sensor signals in the stationary reference frame (e.g., from the motor sensors 155), control signals in the MK or SM/DM reference frame, and sensor signals in the MK or SM/DM reference frame. As described above, the result data set in the MK or SM/DM reference frame may provide new insights into characteristics of the WFS motor 115 not available, for example, in the RDQ or stationary reference frame.

In some embodiments, MK or SM/DM-based control may also be used in state space modeling of a machine. For example, the simulation controller 1005 may execute known simulation software (e.g., incorporated as part of the simulation software 1025), such as Mathworks Matlab/Simulink. The simulation controller 1005 may execute this simulation software to perform state space modeling of a WFS motor, such as the motor 115. For example, a state space model of the WFS motor 115 in the MK or SM/DM reference frame may be received by the simulation controller 1005. The simulation controller 1005 may then receive simulation operation parameters, such as those described above with respect to block 1110. The simulation controller 1005 may then execute the simulation of the state space modeled-WFS motor, and generate simulation results in the MK or SM/DM reference frame. In some instances, the cross-coupling within a WFS motor may prevent successful simulation of its associated electromagnetic circuit in other reference frames. For instance, when simulating the cross coupling of a WFS motor in other reference frames, simulation software can create issues relating to numerical instability such that the fluxes of the system cannot be effectively differentiated or interpolated. However, when modeled in the MK or SM/DM space, simulation may be successfully completed that preserve numerical stability and capability to differentiate and interpolate through the state variables.

The present disclosure has described one or more embodiments, and it should be appreciated that many equivalents, alternatives, variations, and modifications, aside from those expressly stated, are possible and within the scope of the application.

FURTHER EXAMPLES

Example 1: A method, apparatus, and/or non-transitory computer-readable medium storing processor-executable instructions for controlling a motor, comprising: determining, by an electronic motor controller, present motor information; determining, by the electronic motor controller, a motor control parameter set based on the present motor information and a rotating reference frame of the motor, wherein the rotating reference frame has independent input channels that decouple an intended output response in a stator D-axis component and a rotor field (R) component of a direct-quadrature-null-rotor (DQNR) reference frame; and controlling, by the electronic motor controller, the motor based on the motor control parameter set.

Example 2: The method, apparatus, and/or non-transitory computer readable medium of Example 1, wherein determining the present motor information comprises: determining a rotor position angle of a rotor of the motor; and determining, by the electronic motor controller, motor currents including a rotor field current of the rotor and stator currents through respective coils of a stator of the motor.

Example 3: The method, apparatus, and/or non-transitory computer readable medium of any of Examples 1 or 2, wherein the rotating reference frame of the motor is an MK reference frame having a magnetizing inductance axis (M-axis) and a leakage inductance axis (K-axis).

Example 4: The method, apparatus, and/or non-transitory computer readable medium of any of Examples 1 to 3, wherein determining the motor control parameter set comprises: determining, by the electronic motor controller, desired motor voltages of the motor control parameter set including a rotor voltage control for a rotor field voltage of the rotor and stator voltage controls for stator voltages across respective coils of the stator based on a magnetizing inductance current ($I_M$), a leakage inductance current ($I_K$), a quadrature current ($I_Q$), and a null current ($I_{Null}$) indicated by the present motor information.

Example 5: The method, apparatus, and/or non-transitory computer readable medium of any of Example 1 to 4, wherein, in the MK reference frame, leakage current between the stator and the rotor is presumed to be zero or a stator-to-rotor turns ratio is adjusted to equate the leakage current between the stator and the rotor to zero.

Example 6: The method, apparatus, and/or non-transitory computer readable medium of any of Examples 1 or 2, wherein the rotating reference frame of the motor is an SM/DM reference frame having a summation mode axis (SM-axis) and a difference mode axis (DM-axis).

Example 7: The method, apparatus, and/or non-transitory computer readable medium of any of Examples 1, 2, or 6, wherein determining the motor control parameter set comprises: determining, by the electronic motor controller, desired motor voltages for the motor control parameter set including a rotor voltage control for a rotor field voltage of the rotor and stator voltage controls for stator voltages across respective coils of the stator based on a summation mode current ($I_{SM}$), a difference mode current ($I_{DM}$), a quadrature current ($I_Q$), and a null current ($I_{Null}$) indicated by the rotor position angle and the motor currents.

Example 8: The method, apparatus, and/or non-transitory computer readable medium of any of Examples 1 to 7, wherein determining the motor control parameter set comprises: accessing, by the electronic motor controller, a lookup table that maps the present motor information to the motor control parameter set, wherein the lookup table is populated based on a reference frame transform that transforms an input set of motor information to the rotational reference frame.

Example 9: The method, apparatus, and/or non-transitory computer readable medium of any of Example 1 to 8, wherein determining the motor control parameter set comprises: transforming the present motor information to the rotational reference frame to generate transformed present motor information; determining a motor control for a control axis in the rotational reference frame based on the transformed present motor information; and transforming the motor control from the rotational reference frame to the motor control parameter set.

Example 10: The method, apparatus, and/or non-transitory computer readable medium of any of Example 1 to 8, wherein the motor is a wound field synchronous motor, a permanent magnet synchronous motor, or a hybrid permanent magnet-wound field synchronous motor.

Example 11: A method, apparatus, and/or non-transitory computer-readable medium storing processor-executable instructions for simulating a motor, comprising: determining, by an electronic controller, one or more initial motor specifications; determining, by the electronic controller, one or more motor operation simulation parameters; and simulating, by the electronic controller, a motor according to the one or more initial motor specifications and the one or more motor operation simulation parameters using motor control based on a rotating reference frame of the motor, wherein the rotating reference frame has independent input channels that decouple an intended output response in a stator D-axis component and a rotor field (R) component of a direct-quadrature-null-rotor (DQNR) reference frame; and generating simulation results in the rotating reference frame based on the simulating of the motor.

Example 12: The method, apparatus, and/or non-transitory computer readable medium Example 11, wherein using motor control based on the rotating reference frame comprises: determining, by the electronic controller, present motor information; determining, by the electronic controller, a motor control parameter set based on the present motor information and a control axis of the rotating reference frame; and generating, by the electronic controller, one or more control signals for the motor based on the motor control parameter set.

Example 13: The method, apparatus, and/or non-transitory computer readable medium of any of Examples 11 or 12, wherein the rotating reference frame of the motor is an MK reference frame having a magnetizing inductance axis (M-axis) and a leakage inductance axis (K-axis).

Example 14: The method, apparatus, and/or non-transitory computer readable medium of any of Examples 11 to 13, wherein determining the motor control parameter set comprises: determining, by the electronic controller, desired motor voltages for the motor control parameter set including a rotor voltage control for a rotor field voltage of a rotor of the motor and stator voltage controls for stator voltages across respective coils of a stator of the motor based on a magnetizing inductance current ($I_M$), a leakage inductance current ($I_K$), a quadrature current ($I_Q$), and null current ($I_{Null}$) indicated by the present motor information.

Example 15: The method, apparatus, and/or non-transitory computer readable medium of any of Examples 11 or 12, wherein the rotating reference frame of the motor is an SM/DM reference frame having a summation mode axis (SM-axis) and a difference mode axis (DM-axis).

Example 16: The method, apparatus, and/or non-transitory computer readable medium of any of Examples 11, 12, or 15, wherein determining the motor control parameter set comprises: determining, by the electronic controller, desired motor voltages for the motor control parameter set including a rotor voltage control for a rotor field voltage of a rotor of the motor and stator voltage controls for stator voltages across respective coils of a stator of the motor based on a summation mode current ($I_{SM}$), a difference mode current ($I_{DM}$), a quadrature current ($I_Q$), and null current ($I_{Null}$) indicated by the rotor position angle and the motor currents.

Example 17: The method, apparatus, and/or non-transitory computer readable medium of any of Examples 11 to 16, further comprising: determining, by the electronic controller, a modified motor parameter that includes a modified value for at least selected from a group of one of the initial motor specifications and the motor operation simulation parameters; simulating, by the electronic controller, the motor according to the modified motor parameter using motor control based on the rotating reference frame of the motor; and generating further simulation results in the rotating reference frame based on the simulating of the motor.

Example 18: The method, apparatus, and/or non-transitory computer readable medium of Example 17, further comprising: indicating, by the electronic controller, a motor parameter based on the simulation results and the further simulation results, that provides a desired effect for the motor.

Example 19: The method, apparatus, and/or non-transitory computer readable medium of any of Example 11 to 18, wherein the motor is a wound field synchronous motor, a permanent magnet synchronous motor, or a hybrid permanent magnet-wound field synchronous motor.

The invention claimed is:

1. A method for controlling a motor, the method comprising:
    determining, by an electronic motor controller, present motor information, wherein determining the present motor information comprises:
        determining a rotor position angle of a rotor of the motor, and
        determining, by the electronic motor controller, motor currents including a rotor field current of the rotor and stator currents through respective coils of a stator of the motor;
    determining, by the electronic motor controller, a motor control parameter set based on the present motor information and a rotating reference frame of the motor, wherein the rotating reference frame has independent input channels that decouple an intended output response in a stator D-axis component and a rotor field (R) component of a direct-quadrature-null-rotor (DQNR) reference frame of the motor, wherein the stator D-axis component corresponds to the stator and the rotor field (R) component corresponds to the rotor, wherein the rotating reference frame of the motor is an SM/DM reference frame having a summation mode axis (SM-axis) and a difference mode axis (DM-axis), wherein the SM-axis represents a sum of the stator D-axis component and the rotor field (R) component and the DM-axis represents a difference of the stator D-axis component and the rotor field (R) component; and
    controlling, by the electronic motor controller, the motor based on the motor control parameter set.

2. The method of claim 1, wherein determining the motor control parameter set comprises:
    determining, by the electronic motor controller, desired motor voltages for the motor control parameter set including a rotor voltage control for a rotor field voltage of the rotor and stator voltage controls for stator voltages across respective coils of the stator based on a summation mode current ($I_{SM}$) of the SM/DM reference frame, a difference mode current ($I_{DM}$) of the SM/DM reference frame, a quadrature current ($I_Q$) of the SM/DM reference frame, and a null current ($I_{Null}$) of the SM/DM reference frame determined based on the rotor position angle and the motor currents.

3. The method of claim 2,
wherein the summation mode current ($I_{SM}$) represents a sum of rotor D-axis current of the rotor and stator D-axis current of the stator, and
wherein the difference mode current ($I_{DM}$) represents a difference of the rotor D-axis current of the rotor and the stator D-axis current of the stator.

4. The method of claim 1, wherein determining the motor control parameter set comprises:
accessing, by the electronic motor controller, a lookup table that maps the present motor information to the motor control parameter set, wherein the lookup table is populated based on a reference frame transform that transforms an input set of motor information to the rotational reference frame.

5. The method of claim 1, wherein determining the motor control parameter set comprises:
transforming the present motor information to the rotational reference frame to generate transformed present motor information;
determining a motor control for a control axis in the rotational reference frame based on the transformed present motor information; and
transforming the motor control from the rotational reference frame to the motor control parameter set.

6. The method of claim 1, wherein the motor is a wound field synchronous motor, a permanent magnet synchronous motor, or a hybrid permanent magnet-wound field synchronous motor.

7. The method of claim 1,
wherein the rotor D-axis component is rotor D-axis current of the rotor, and
wherein the stator D-axis component is stator D-axis current of the stator.

8. A motor system comprising:
an electronic motor controller including an electronic processor, the electronic motor controller configured to:
determine present motor information, wherein, to determine the present motor information, the electronic motor controller is configured to:
determine a rotor position angle of a rotor of the motor, and
determine motor currents including a rotor field current of the rotor and stator currents through respective coils of a stator of the motor;
determine a motor control parameter set based on the present motor information and a rotating reference frame of a motor, wherein the rotating reference frame has independent input channels that decouple an intended output response in a stator D-axis component and a rotor field (R) component of a direct-quadrature-null-rotor (DQNR) reference frame of the motor, wherein the stator D-axis component corresponds to the stator and the rotor field (R) component corresponds to the rotor, wherein the rotating reference frame of the motor is an SM/DM reference frame having a summation mode axis (SM-axis) and a difference mode axis (DM-axis),
wherein the SM-axis represents a sum of the stator D-axis component and the rotor field (R) component and the DM-axis represents a difference of the stator D-axis component and the rotor field (R) component; and
generate one or more control signals to control the motor based on the motor control parameter set.

9. The motor system of claim 8, wherein, to determine the motor control parameter set, the electronic motor controller is configured to:
determine desired motor voltages for the motor control parameter set including a rotor voltage control for a rotor field voltage of the rotor and stator voltage controls for stator voltages across respective coils of the stator based on a summation mode current ($I_{SM}$) of the SM/DM reference frame, a difference mode current ($I_{DM}$) of the SM/DM reference frame, a quadrature current ($I_Q$) of the SM/DM reference frame, and a null current ($I_{Null}$) of the SM/DM reference frame determined based on the rotor position angle and the motor currents.

10. The motor system of claim 9,
wherein the summation mode current ($I_{SM}$) represents a sum of rotor D-axis current of the rotor and stator D-axis current of the stator, and
wherein the difference mode current ($I_{DM}$) represents a difference of the rotor D-axis current of the rotor and the stator D-axis current of the stator.

11. The motor system of claim 8, wherein, to determine the motor control parameter set, the electronic motor controller is configured to:
access a lookup table that maps the present motor information to the motor control parameter set, wherein the lookup table is populated based on a reference frame transform that transforms an input set of motor information to the rotational reference frame.

12. The motor system of claim 8, wherein, to determine the motor control parameter set, the electronic motor controller is configured to:
transform the present motor information to the rotational reference frame to generate transformed present motor information;
determine a motor control for a control axis in the rotational reference frame based on the transformed present motor information; and
transform the motor control from the rotational reference frame to the motor control parameter set.

13. The motor system of claim 8, further comprising:
the motor; and
a motor drive circuit coupled to the motor and to the electronic motor controller, the motor drive circuit configured to receive the one or more control signals and to drive the motor.

14. The motor system of claim 8, wherein the motor is a wound field synchronous motor, a permanent magnet synchronous motor, or a hybrid permanent magnet-wound field synchronous motor.

15. The motor system of claim 8,
wherein the rotor D-axis component is rotor D-axis current of the rotor, and
wherein the stator D-axis component is stator D-axis current of the stator.

* * * * *

UNITED STATES PATENT AND TRADEMARK OFFICE
CERTIFICATE OF CORRECTION

| | | |
|---|---|---|
| PATENT NO. | : 12,107,522 B2 | Page 1 of 1 |
| APPLICATION NO. | : 18/576699 | |
| DATED | : October 1, 2024 | |
| INVENTOR(S) | : Walter Wesley Pennington, III et al. | |

It is certified that error appears in the above-identified patent and that said Letters Patent is hereby corrected as shown below:

In the Specification

Column 19, Line 10, "Ik" should be --$I_K$--.

Column 20, Line 54, "Io" should be --$I_Q$--.

Column 30, Line 42, "as Ism and" should be --as $I_{SM}$ and--.

Column 30, Line 42, "illustrated, Ism and" should be --illustrated, $I_{SM}$ and--.

Signed and Sealed this
Twenty-fifth Day of February, 2025

Coke Morgan Stewart
*Acting Director of the United States Patent and Trademark Office*